US012526455B2

United States Patent
De Luxán Hernández et al.

(10) Patent No.: US 12,526,455 B2
(45) Date of Patent: Jan. 13, 2026

(54) DECODER, ENCODER AND METHODS COMPRISING A CODING FOR INTRA SUBPARTITIONS

(71) Applicant: Fraunhofer-Gesellschaft zur Foerderung der angewandten Forschung e.V., Munich (DE)

(72) Inventors: Santiago De Luxán Hernández, Berlin (DE); Valeri George, Berlin (DE); Gayathri Venugopal, Berlin (DE); Jens Brandenburg, Berlin (DE); Benjamin Bross, Berlin (DE); Heiko Schwarz, Berlin (DE); Detlev Marpe, Berlin (DE); Thomas Wiegand, Berlin (DE)

(73) Assignee: Fraunhofer-Gesellschaft Zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 18/818,310

(22) Filed: Aug. 28, 2024

(65) Prior Publication Data
US 2024/0422356 A1    Dec. 19, 2024

Related U.S. Application Data

(63) Continuation of application No. 17/554,429, filed on Dec. 17, 2021, now Pat. No. 12,108,084, which is a
(Continued)

(30) Foreign Application Priority Data

Jun. 25, 2019    (EP) .................................... 19182425
Aug. 13, 2019    (EP) .................................... 19191601
Sep. 24, 2019    (EP) .................................... 19199382

(51) Int. Cl.
*H04N 19/61*    (2014.01)
*H04N 19/159*    (2014.01)
(Continued)

(52) U.S. Cl.
CPC ........... *H04N 19/61* (2014.11); *H04N 19/159* (2014.11); *H04N 19/176* (2014.11); *H04N 19/46* (2014.11); *H04N 19/625* (2014.11); *H04N 19/70* (2014.11)

(58) Field of Classification Search
None
See application file for complete search history.

(56) References Cited

U.S. PATENT DOCUMENTS 11,582,486 B2 *    2/2023    Koo ....................... H04N 19/12
12,063,384 B2 *    8/2024    Lee ...................... H04N 19/119
(Continued)

FOREIGN PATENT DOCUMENTS

WO    2018037737 A1    6/2019
WO    2020206254 A1    10/2020

OTHER PUBLICATIONS

Jang, Hyeongmun, et al., "Adaptive NSST Kernel Size Selection", Jang H. et al., 5. JVET Meeting; Jan. 12, 2017-Jan. 20, 2017; Geneva; (The Joint Video Exploration Team of ISO/IEC JTC1/SC29/WG11 and ITU-T SG.16), 6 pp.
(Continued)

*Primary Examiner* — Talha M Nawaz
(74) *Attorney, Agent, or Firm* — Conley Rose, P.C.

(57) ABSTRACT

Decoder for decoding a picture, wherein blocks into which the picture is subdivided are assigned to a set of prediction types, which include intra prediction and inter prediction. For each of predetermined intra-predicted blocks, the decoder is configured to derive, from the data stream, an information on a partitioning of the respective predetermined intra-predicted block into partitions. The decoder is configured to derive, from the data stream, for each partition of the respective predetermined intra-predicted block, a partition-specific prediction residual signal related to a spatial domain prediction residual signal of the respective
(Continued)

partition of the respective predetermined intra-predicted block via a predetermined transform. The predetermined transform can be identified out of a set of transforms including a first transform and a second transform, which equals a concatenation of a primary transform and a secondary transform applied onto a subset of coefficients of the primary transform.

14 Claims, 15 Drawing Sheets

Related U.S. Application Data continuation of application No. PCT/EP2020/067549, filed on Jun. 23, 2020.

(51) Int. Cl.
*H04N 19/176* (2014.01)
*H04N 19/46* (2014.01)
*H04N 19/625* (2014.01)
*H04N 19/70* (2014.01)

(56) References Cited

U.S. PATENT DOCUMENTS

| | | | | |
|---|---|---|---|---|
| 12,219,130 | B2* | 2/2025 | Heo | H04N 19/463 |
| 2006/0176962 | A1* | 8/2006 | Arimura | H04N 19/137 |
| | | | | 375/E7.17 |
| 2017/0264914 | A1 | 9/2017 | Agyo | |
| 2018/0192070 | A1 | 7/2018 | Dupuis | |
| 2019/0110049 | A1* | 4/2019 | Gordon | H04N 19/176 |
| 2019/0268594 | A1 | 8/2019 | Lim | |
| 2020/0105022 | A1 | 4/2020 | Mora | |
| 2024/0015328 | A1* | 1/2024 | Zhang | H04N 9/67 |

OTHER PUBLICATIONS

Koo, Moonmo, et al., "Reduced Secondary Transform (RST) Algorithm Description (JVET-N0193)", Koo (LGE) M et al., "CE6: Reduced Secondary Transform (RST) (CE6-3.1)", No. JVET-N0193, (Mar. 27, 2019), 14. JVET Meeting; Mar. 19, 2019-Mar. 27, 2019; Geneva; (The Joint Video Exploration Team of ISO/IEC JTC1/SC29/WG11 and ITU-T SG.16), 16 pp.

Pfaff, Jonathan, et al., "Intra prediction modes based on neural networks", Pfaff J. et al., 10. JVET Meeting; Apr. 10, 2018-Apr. 20, 2018; San Diego; (The Joint Video Exploration Team of ISO/IEC JTC1/SC29/ WG11 and ITU-T SG. 16), 14 pp.

Zhao, X., et al.; "TU-level Non-separable Secondary Transform"; JVET-B00059; Feb. 20-26, 2016; 5 pages.

Bross, Benjamin; "Versatile Video Coding (daft 4)"; JVET-M1001-v7; Jan. 9-18, 2019; 12 pages.

Koo et al: "CE6: Reduced Secondary Transform (RST) (CE6-3.1)", JVET Meeting Mar. 19, 2019-Mar. 27, 2019 Geneva No. JVET-N0193-v5.

* cited by examiner

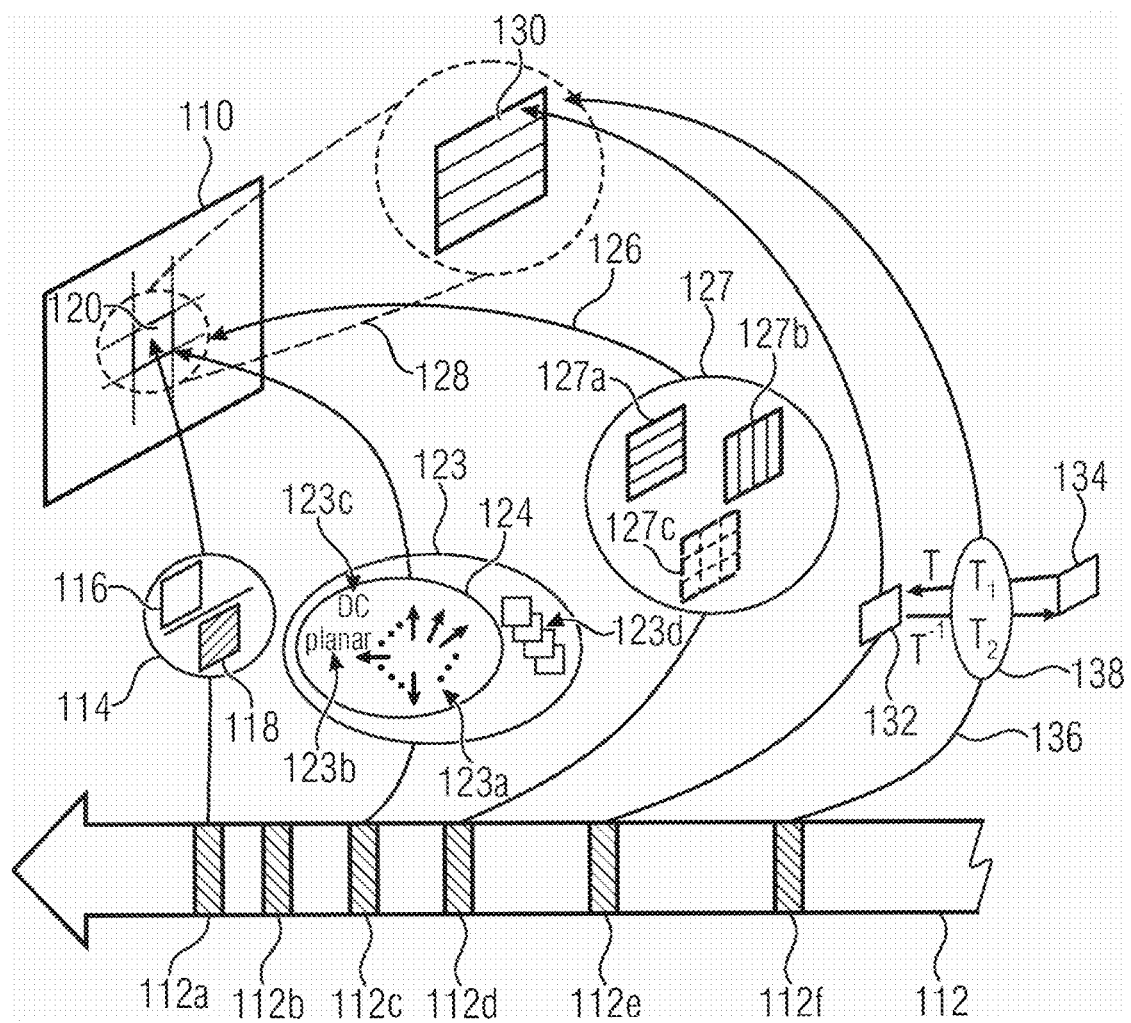
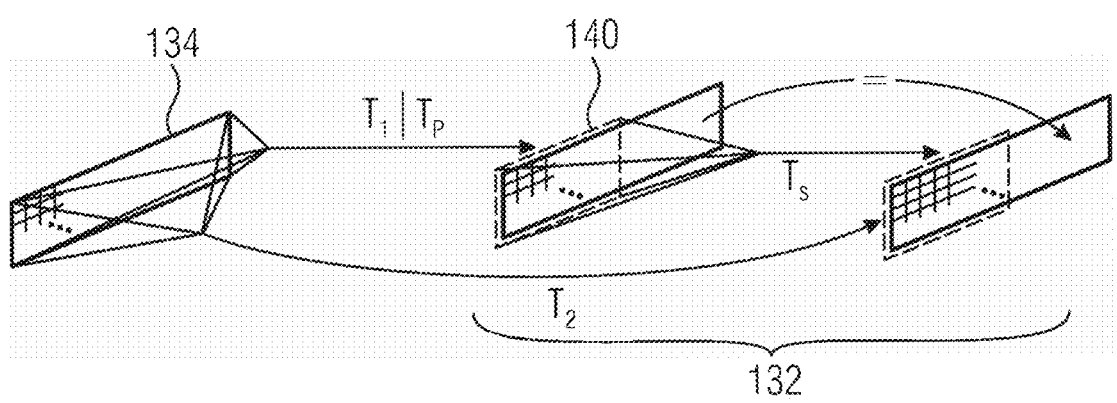
Fig. 4

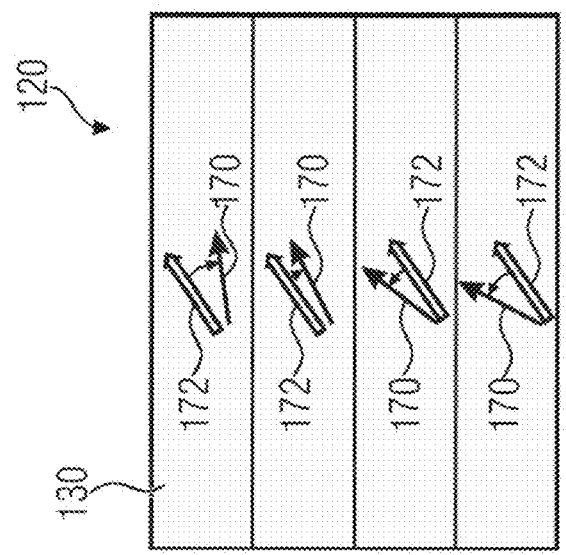
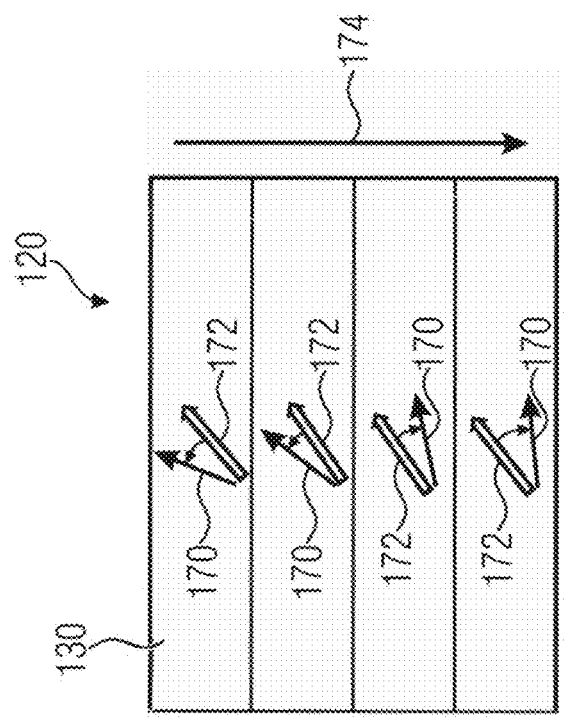
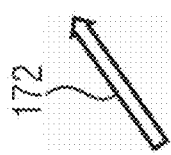
Fig. 8

| |
|---|
| LfnstDcOnly = 1 |
| LfnstZeroOutSigCoeffFlag = 1 |
| MtsDcOnly = 1 |
| MtsZeroOutSigCoeffFlag = 1 |
| transform_tree( x0, y0, cbWidth, cbHeight, treeType, chType )  ~113 |
| lfnstWidth = ( treeType == DUAL_TREE_CHROMA ) ? cbWidth / SubWidthC: <br>    ( ( IntraSubPartitionsSplitType == ISP_VER_SPLIT ) ? <br>      cbWidth / NumIntraSubPartitions : cbWidth ) |
| lfnstHeight = ( treeType == DUAL_TREE_CHROMA ) ? cbHeight / SubHeightC : <br>    ( ( IntraSubPartitionsSplitType == ISP_HOR_SPLIT ) ? <br>      cbHeight / NumIntraSubPartitions : cbHeight ) |
| lfnstNotTsFlag = ( treeType == DUAL_TREE_CHROMA \|\| <br>    !tu_y_coded_flag[ x0 ][ y0 ] \|\| <br>    transform_skip_flag[ x0 ][ y0 ][ 0 ] == 0 ) && <br>  ( treeType == DUAL_TREE_LUMA \|\| <br>    ( (!tu_cb_coded_flag[ x0 ][ y0 ] \|\| <br>    transform_skip_flag[ x0 ][ y0 ][ 1 ] == 0 ) && <br>    ( !tu_cr_coded_flag[ x0 ][ y0 ] \|\| <br>    transform_skip_flag[ x0 ][ y0 ][ 2 ] == 0 ) ) ) |
| if( Min( lfnstWidth, lfnstHeight ) >= 4 && sps_lfnst_enabled_flag == 1 && <br>  CuPredMode[ chType ][ x0 ][ y0 ] == MODE_INTRA && lfnstNotTsFlag == 1 && <br>  ( treeType == DUAL_TREE_CHROMA \|\| !intra_mip_flag[ x0 ][ y0 ] \|\| <br>    Min( lfnstWidth, lfnstHeight ) >= 16 ) && <br>  Max( cbWidth, cbHeight ) <= MaxTbSizeY ) { |
|   if( ( IntraSubPartitionsSplitType != ISP_NO_SPLIT \|\| LfnstDcOnly == 0 ) && <br>    LfnstZeroOutSigCoeffFlag == 1 ) |
|     lfnst_idx |
| } |
| if( treeType != DUAL_TREE_CHROMA && lfnst_idx == 0 && <br>  transform_skip_flag[ x0 ][ y0 ][ 0 ] == 0 && Max( cbWidth, cbHeight ) <= 32 && <br>  IntraSubPartitionsSplitType == ISP_NO_SPLIT && cu_sbt_flag == 0 && <br>  MtsZeroOutSigCoeffFlag == 1 && MtsDcOnly == 0 ) { |
|   if( ( ( CuPredMode[ chType ][ x0 ][ y0 ] == MODE_INTER && <br>    sps_explicit_mts_inter_enabled_flag ) \|\| <br>    ( CuPredMode[ chType ][ x0 ][ y0 ] == MODE_INTRA && <br>    sps_explicit_mts_inter_enabled_flag ) ) ) |
|     mts_idx |
| } |
| } |
| } |

Fig. 15

DECODER, ENCODER AND METHODS COMPRISING A CODING FOR INTRA SUBPARTITIONS

CROSS-REFERENCE TO RELATED APPLICATIONS

This application is a continuation of U.S. application Ser. No. 17/554,429, filed on Dec. 17, 2021, which is a continuation of and claims priority to International Application No. PCT/EP2020/067549, filed Jun. 23, 2020, and additionally claims priority from European Application Nos. EP 19182425.9, filed Jun. 25, 2019; EP 1919601.4, filed Aug. 13, 2019; and EP 19199382.3, filed Sep. 24, 2019, all of which are incorporated herein by reference in their entirety.

The present application is concerned with picture coding/decoding or video coding/decoding.

In the following, different inventive embodiments and aspects will be described.

Also, further embodiments will be defined by the enclosed claims.

It should be noted that any embodiments as defined by the claims can be supplemented by any of the details (features and functionalities) described in the following embodiments.

Also, the embodiments can be used individually, and can also be supplemented by any of the features in another embodiment, or by any feature included in the claims.

Also, it should be noted that individual aspects described herein can be used individually or in combination. Thus, details can be added to each of said individual aspects without adding details to another one of said aspects.

It should also be noted that the present disclosure describes, explicitly or implicitly, features usable in an encoder (apparatus for providing an encoded representation of an input signal, e.g. a picture or a video) and in a decoder (apparatus for providing a decoded representation of a signal on the basis of an encoded representation). Thus, any of the features described herein can be used in the context of an encoder and in the context of a decoder.

Moreover, features and functionalities disclosed herein relating to a method can also be used in an apparatus (configured to perform such functionality). Furthermore, any features and functionalities disclosed herein with respect to an apparatus can also be used in a corresponding method. In other words, the methods disclosed herein can be supplemented by any of the features and functionalities described with respect to the apparatuses.

Also, any of the features and functionalities described herein can be implemented in hardware or in software, or using a combination of hardware and software, as will be described in the section "implementation alternatives".

BACKGROUND OF THE INVENTION

Today, for encoding or decoding a picture or a video, exist coding restrictions for blocks using intra subpartitions.

SUMMARY

An embodiment may have a decoder for decoding a picture, configured to derive, from a data stream, into which the picture is coded, an assignment of a picture, at a granularity of blocks into which the picture is subdivided, to a set of prediction types which include intra prediction and inter prediction, so that each block is assigned to an associated prediction type out of the set of prediction types, derive, from the data stream, for each of intra-predicted blocks to which the intra-prediction is assigned, an associated intra-prediction mode out of a set of intra-prediction modes, for each of predetermined intra-predicted blocks the associated intra-prediction mode of which is contained within a predetermined subset of predetermined intra-prediction modes, derive, from the data stream, an information on a partitioning of the respective predetermined intra-predicted block into partitions, and intra-predict each partition of the respective predetermined intra-predicted block in a manner depending on the predetermined intra-prediction mode assigned to the respective predetermined intra-predicted block, derive, from the data stream, for each block, an information on a prediction residual for the respective block, by deriving the prediction residual for each predetermined intra-predicted block by deriving, from the data stream, for each partition of the respective predetermined intra-predicted block, a partition-specific prediction residual signal related to a spatial domain prediction residual signal of the respective partition of the respective predetermined intra-predicted block via a predetermined transform, deriving, from the data stream, an information which identifies the predetermined transform out of a set of transforms including a first transform and a second transform which equals a concatenation of a primary transform and a secondary transform applied onto a subset of coefficients of the primary transform, and reconstruct each block using the information on the prediction residual for the respective block and a prediction signal obtained using the prediction type assigned to the respective block.

Another embodiment may have an encoder for encoding a picture, configured to encode, into a data stream, into which the picture is coded, an assignment of a picture, at a granularity of blocks into which the picture is subdivided, to a set of prediction types which include intra prediction and inter prediction, so that each block is assigned to an associated prediction type out of the set of prediction types, encode, into the data stream, for each of intra-predicted blocks to which the intra-prediction is assigned, an associated intra-prediction mode out of a set of intra-prediction modes, for each of predetermined intra-predicted blocks the associated intra-prediction mode of which is contained within a predetermined subset of predetermined intra-prediction modes, encode, into the data stream, an information on a partitioning of the respective predetermined intra-predicted block into partitions, and intra-predict each partition of the respective predetermined intra-predicted block in a manner depending on the predetermined intra-prediction mode assigned to the respective predetermined intra-predicted block, encode, into the data stream, for each block, an information on a prediction residual for the respective block, by encoding the prediction residual for each predetermined intra-predicted block by encoding, into the data stream, for each partition of the respective predetermined intra-predicted block, a partition-specific prediction residual signal related to a spatial domain prediction residual signal of the respective partition of the respective predetermined intra-predicted block via a predetermined transform, encoding, into the data stream, an information which identifies the predetermined transform out of a set of transforms including a first transform and a second transform which equals a concatenation of a primary transform and a secondary transform applied onto a subset of coefficients of the primary transform, and wherein for each block the respective block is reconstructable using the information on the prediction residual for the respective block and a prediction signal obtained using the prediction type assigned to the respective block.

According to another embodiment, a method for decoding a picture may have the steps of: deriving, from a data stream, into which the picture is coded, an assignment of a picture, at a granularity of blocks into which the picture is subdivided, to a set of prediction types which include intra prediction and inter prediction, so that each block is assigned to an associated prediction type out of the set of prediction types, deriving, from the data stream, for each of intra-predicted blocks to which the intra-prediction is assigned, an associated intra-prediction mode out of a set of intra-prediction modes, for each of predetermined intra-predicted blocks the associated intra-prediction mode of which is contained within a predetermined subset of predetermined intra-prediction modes, deriving, from the data stream, an information on a partitioning of the respective predetermined intra-predicted block into partitions, and intra-predicting each partition of the respective predetermined intra-predicted block in a manner depending on the predetermined intra-prediction mode assigned to the respective predetermined intra-predicted block, deriving, from the data stream, for each block, an information on a prediction residual for the respective block, by deriving the prediction residual for each predetermined intra-predicted block by deriving, from the data stream, for each partition of the respective predetermined intra-predicted block, a partition-specific prediction residual signal related to a spatial domain prediction residual signal of the respective partition of the respective predetermined intra-predicted block via a predetermined transform, deriving, from the data stream, an information which identifies the predetermined transform out of a set of transforms including a first transform and a second transform which equals a concatenation of a primary transform and a secondary transform applied onto a subset of coefficients of the primary transform, and reconstructing each block using the information on the prediction residual for the respective block and a prediction signal obtained using the prediction type assigned to the respective block.

According to another embodiment, a method for encoding a picture may have the steps of: encoding, into a data stream, into which the picture is coded, an assignment of a picture, at a granularity of blocks into which the picture is subdivided, to a set of prediction types which include intra prediction and inter prediction, so that each block is assigned to an associated prediction type out of the set of prediction types, encoding, into the data stream, for each of intra-predicted blocks to which the intra-prediction is assigned, an associated intra-prediction mode out of a set of intra-prediction modes, for each of predetermined intra-predicted blocks the associated intra-prediction mode of which is contained within a predetermined subset of predetermined intra-prediction modes, encoding, into the data stream, an information on a partitioning of the respective predetermined intra-predicted block into partitions, and intra-predicting each partition of the respective predetermined intra-predicted block in a manner depending on the predetermined intra-prediction mode assigned to the respective predetermined intra-predicted block, encoding, into the data stream, for each block, an information on a prediction residual for the respective block, by encoding the prediction residual for each predetermined intra-predicted block by encoding, into the data stream, for each partition of the respective predetermined intra-predicted block, a partition-specific prediction residual signal related to a spatial domain prediction residual signal of the respective partition of the respective predetermined intra-predicted block via a predetermined transform, encoding, into the data stream, an information which identifies the predetermined transform out of a set of transforms including a first transform and a second transform which equals a concatenation of a primary transform and a secondary transform applied onto a subset of coefficients of the primary transform, and wherein for each block the respective block is reconstructable using the information on the prediction residual for the respective block and a prediction signal obtained using the prediction type assigned to the respective block.

Another embodiment may have a non-transitory digital storage medium having a computer program stored thereon to perform any of the inventive methods when said computer program is run by a computer.

Another embodiment may have a data stream obtainable by the inventive method for encoding a picture.

In accordance with a first aspect, the inventors of the present application realized that one problem encountered when encoding or decoding blocks using intra subpartitions (ISP) stems from the fact that currently in VTM-5.0 intra subpartitions cannot use the Low Frequency Non-Separable Transform (LFNST), i.e. a secondary transform. According to the first aspect of the present application, this difficulty is overcome by enabling the usage of a secondary transform on blocks using the ISP, namely by allowing the usage of a two-stage transform at a transform unit level. The usage of a first transform and a concatenation of a primary and secondary transform at intra subpartitions introduces additional syntax elements, but it was found, that this additional signaling overhead is overcompensated by the fact that the secondary transform, which follows the primary transform, is able to better condense non-zero coefficients, thereby resulting in a reduced amount of data used to represent a partition specific residual block. It was found, that by using the secondary transform also for intra subpartitions, a higher coding efficiency and a reduced bit rate can be achieved. In the following, a second transform can equal a concatenation of the primary transform and the secondary transform applied onto a subset of coefficients of the first transform. The primary transform may be the first transform. The enabling of the second transform for intra partitions can be linked to certain conditions. The second transform is, for example, enabled for a partition, in case of no non-zero transform coefficient, i.e. a non-zero coefficient of the primary transform, being outside a predetermined area and/or a number of the non-zero transform coefficients is equal or lower than a predetermined limit and/or a last non-zero coefficient position along a scan path leading from DC coefficient position to a highest frequency coefficient position, as indicated by a last position syntax element in the data stream, is equal or lower than a further predetermined threshold.

Accordingly, in accordance with a first aspect of the present application, an encoder for encoding a picture and a decoder for decoding a picture are proposed. The decoder/encoder is configured to derive/encode, from/into a data stream, into which the picture is coded, an assignment of a picture, at a granularity of blocks into which the picture is subdivided, to a set of prediction types which comprise intra prediction and inter prediction, so that each block is assigned to an associated prediction type out of the set of prediction types. Thus each block of a picture is, for example, either assigned to intra-prediction or inter-prediction. The assignment can define for each block the prediction type. Additionally, the decoder/encoder is configured to derive/encode, form/into the data stream, for each of intra-predicted blocks to which the intra-prediction is assigned, an associated intra-prediction mode out of a set of intra-prediction modes.

For each of predetermined intra-predicted blocks the associated intra-prediction mode of which is contained within a predetermined subset of predetermined intra-prediction modes, the decoder/encoder is configured to derive/encode, from/into the data stream, an information on a partitioning of the respective predetermined intra-predicted block into partitions. The information on the partitioning can indicate a horizontal-split, a vertical-split or a quad-split. Additionally, for each of predetermined intra-predicted blocks, the encoder/decoder is configured to intra-predict each partition of the respective predetermined intra-predicted block in a manner depending on the predetermined intra-prediction mode assigned to the respective predetermined intra-predicted block. The predetermined intra-prediction mode for the respective predetermined intra-predicted block can be represented by the intra-prediction mode out of the set of intra-prediction modes for the predetermined intra-predicted block. For each partition of the respective predetermined intra-predicted block, the same intra-prediction mode, namely the predetermined intra-prediction mode, can be used for the intra-prediction. The predetermined subset of predetermined intra-prediction modes is, for example a subset of the set of intra-prediction modes. For each of predetermined intra-predicted blocks, the predetermined subset of predetermined intra-prediction modes defines, for example, a list of most probable intra-prediction modes out of the set of intra-prediction modes for the respective predetermined intra-predicted block.

The decoder/encoder is configured to derive/encode, from/into the data stream, for each block, an information on a prediction residual for the respective block, by deriving/encoding the prediction residual for each predetermined intra-predicted block by deriving/encoding, from/into the data stream, for each partition of the respective predetermined intra-predicted block, a partition-specific prediction residual signal related to a spatial domain prediction residual signal of the respective partition of the respective predetermined intra-predicted block via a predetermined transform. For each partition of the respective predetermined intra-predicted block the partition-specific prediction residual signal can be in a transform domain. Additionally, the decoder/encoder is configured to derive/encode, from/into the data stream, for each block, an information on a prediction residual for the respective block, by deriving/encoding the prediction residual for each predetermined intra-predicted block by deriving/encoding, from/into the data stream, an information which identifies the predetermined transform out of a set of transforms including a first transform and a second transform which equals a concatenation of a primary transform and a secondary transform applied onto a subset of coefficients of the primary transform. The primary transform may be the first transform. In this case, the second transform equals a concatenation of the first transform and the secondary transform applied onto a subset of coefficients of the first transform. In case of the predetermined transform being the second transform, the decoder/encoder can be configured to use the primary transform and the secondary transform individually or use one transform combining the primary transform and the secondary transform, leading to the same result. Alternatively, the predetermined transform is the first transform and no secondary transform is comprised by the predetermined transform for the respective partition. The decoder/encoder can be configured to perform the deriving/encoding, from/into the data stream, of the information which identifies the predetermined transform out of the set of transforms by reading/transmitting a transform syntax element transmitted in the data stream for the respective predetermined intra-predicted block. The information which identifies the predetermined transform out of a set of transforms can be an index pointing into a list of transforms, wherein the list of transforms can equal the set of transforms or comprise a subset of the set of transforms. The transforms comprised in the decoder set of transforms can be inverse transforms of the transforms comprised in the encoder set of transforms.

Additionally, the decoder is configured to reconstruct each block using the information on the prediction residual for the respective block and a prediction signal obtained using the prediction type assigned to the respective block. For each block, encoded by the encoder, the respective block is reconstructable using the information on the prediction residual for the respective block and a prediction signal obtained using the prediction type assigned to the respective block.

The information which identifies the predetermined transform out of a set of transforms can be derived/encoded for the respective predetermined intra-predicted block or for each partition of the respective predetermined intra-predicted block individually. In other words, the decoder/encoder can be configured to perform the deriving/encoding, from/into the data stream, of the information which identifies the predetermined transform out of the set of transforms per partition or block globally. If the information is derived/encoded block globally, the predetermined transform is identical for each partition of the respective predetermined intra-predicted block.

According to an embodiment, the information which identifies the predetermined transform out of a set of transforms can be derived/encoded by reading/transmitting, from/into the data stream, a secondary transform flag (transmitted) in the data stream for the respective predetermined intra-predicted block in/from that data stream which indicates whether the predetermined transform is the first transform or the second transform. The secondary transform flag can indicate block globally whether the second transform is used or not. In case of an indication of a usage of the second transform, the decoder/encoder can be configured to derive/encode the information which identifies the predetermined transform by deriving/encoding, for each partition, an information which identifies the second transform for the respective partition. The information identifying the second transform can indicate the primary transform and/or the secondary transform. If the primary transform and/or the secondary transform cannot be set or selected by default or based on the associated intra-prediction-mode, block dimensions, partition dimensions, a partition processing rank and/or the partitioning, the information identifying the second transform may be derived/signaled from/into the data stream. According to an embodiment, the primary transform is set and the secondary transform is selected based on the information identifying the second transform or the secondary transform is set and the primary transform is selected based on the information identifying the second transform.

In accordance with a second aspect, the inventors of the present application realized that one problem encountered when partitioning blocks stems from the fact that the current design of intra subpartitions (ISP) allows only the usage of a horizontal split or a vertical split resulting in partitions with different horizontal and vertical dimensions. According to the second aspect of the present application, this difficulty is overcome by introducing a quad-split dividing a block in both horizontal and vertical dimensions. This quad-split can result in partitions with the same horizontal and vertical dimension. Thus equally sized partitions can be achieved. The introduction of a third partitioning, which might be called a quad-split, needs, compared to just selecting among horizontal and vertical splits, increased signaling overhead by having to discriminate between horizontal, vertical and quad splits, and, may thus, need an additional syntax element or a syntax element with an increased number of states, but it was found, that a higher coding efficiency and a reduced bit rate can be achieved.

Accordingly, in accordance with a second aspect of the present application, an encoder for encoding a picture and a decoder for decoding a picture are proposed. The Decoder/Encoder is configured to derive/encode from/into a data stream, from/into which the picture is coded, an assignment of a picture, at a granularity of blocks into which the picture is subdivided, to a set of prediction types which comprise intra prediction and inter prediction, so that each block is assigned to an associated prediction type out of the set of prediction types. Thus each block of a picture is, for example, either assigned to intra-prediction or inter-prediction. The assignment can define for each block the prediction type. Additionally, the decoder/encoder is configured to derive/encode, form/into the data stream, for each of intra-predicted blocks to which the intra-prediction is assigned, an associated intra-prediction mode out of a set of intra-prediction modes.

For each of predetermined intra-predicted blocks the associated intra-prediction mode of which is contained within a predetermined subset of predetermined intra-prediction modes, the decoder/encoder is configured to derive/encode, from/into the data stream, an information which identifies a partitioning of the respective predetermined intra-predicted block into partitions out of a set of partitioning modes including a first partitioning according to which the respective predetermined intra-predicted block is horizontally split so that the partitions of the respective predetermined intra-predicted block become as wide as the respective predetermined intra-predicted block, a second partitioning according to which the respective predetermined intra-predicted block is vertically split so that the partitions of the respective predetermined intra-predicted block become as high as the respective predetermined intra-predicted block and a third partitioning according to which the respective predetermined intra-predicted block is split horizontally and vertically so that the partitions of the respective predetermined intra-predicted block are arranged in partition rows and partition columns. At the horizontal split, the respective predetermined intra-predicted block is partitioned along the vertical dimension resulting in n partitions with the same horizontal size as the respective predetermined intra-predicted block and a reduced vertical size equaling 1/n times a vertical size of the respective predetermined intra-predicted block. At the vertical split, the respective predetermined intra-predicted block is partitioned along the horizontal dimension resulting in n partitions with the same vertical size as the respective predetermined intra-predicted block and a reduced horizontal size equaling 1/n times a horizontal size of the respective predetermined intra-predicted block. At the third partitioning, the respective predetermined intra-predicted block can be partitioned along the horizontal dimension into n parts and along the vertical dimension into n parts resulting in $n^2$ partitions with a reduced horizontal size equaling 1/n times a horizontal size of the respective predetermined intra-predicted block and a reduced vertical size equaling 1/n times a vertical size of the respective predetermined intra-predicted block.

Additionally, the Decoder/Encoder is configured to intra-predict each partition of the respective predetermined intra-predicted block in a manner depending on the predetermined intra-prediction mode assigned to the respective predetermined intra-predicted block, for each of predetermined intra-predicted blocks the associated intra-prediction mode of which is contained within a predetermined subset of predetermined intra-prediction modes.

Furthermore the Decoder/Encoder is configured to derive/encode, from/into the data stream, for each block, an information on a prediction residual for the respective block, by deriving/encoding the prediction residual for each predetermined intra-predicted block by deriving/encoding, from/into the data stream, for each partition of the respective predetermined intra-predicted block, a partition-specific prediction residual signal related to a spatial domain prediction residual signal of the respective partition of the respective predetermined intra-predicted block via a predetermined transform.

Additionally, the decoder is configured to reconstruct each block using the information on the prediction residual for the respective block and a prediction signal obtained using the prediction type assigned to the respective block. For each block, encoded by the encoder, the respective block is reconstructable using the information on the prediction residual for the respective block and a prediction signal obtained using the prediction type assigned to the respective block.

In accordance with a third aspect, the inventors of the present application realized that one problem encountered when encoding or decoding blocks using intra subpartitions (ISP) stems from the fact that the current design of intra subpartitions (ISP) allows only the usage of the same intra-prediction mode for all partitions of a block. According to the third aspect of the present application, this difficulty is overcome by using a predetermined rule to determine a partition-specific intra prediction mode for each partition of a predetermined intra-predicted block. According to the predetermined rule the partition-specific intra prediction mode is determined based on a block global intra-prediction mode. With this feature it is possible to consider local variations between partitions of a block at an intra-prediction of the block. The determination of an individual intra-prediction for each partition is guided by information in the data stream such as an additional syntax element indicating that individual intra-prediction modes are used and/or an additional syntax element indicating the predetermined rule out of a set of rules, but despite the additional signaling overhead associated therewith, it was found, that a higher coding efficiency and coding quality can be achieved.

Accordingly, in accordance with a third aspect of the present application, an encoder for encoding a picture and a decoder for decoding a picture are proposed. The decoder/encoder is configured to derive/encode from/into a data stream, from/into which the picture is coded, an assignment of a picture, at a granularity of blocks into which the picture is subdivided, to a set of prediction types which comprise intra prediction and inter prediction, so that each block is assigned to an associated prediction type out of the set of prediction types. Thus each block of a picture is, for example, either assigned to intra-prediction or inter-prediction. The assignment can define for each block the prediction type. Additionally, the decoder/encoder is configured to derive/encode, form/into the data stream, for each of intra-predicted blocks to which the intra-prediction is assigned, an associated intra-prediction mode out of a set of intra-prediction modes.

For each of predetermined intra-predicted blocks the associated intra-prediction mode of which is contained within a predetermined subset of predetermined intra-prediction modes, the decoder/encoder is configured to derive/encode, from/into the data stream, an information on a partitioning of the respective predetermined intra-predicted block into partitions and derive/encode, from the data stream, an information which identifies a predetermined rule out of a set of rules, using which, for each partition of the respective predetermined intra-predicted block, a partition-specific intra prediction mode is determined out of the predetermined subset of predetermined intra-prediction modes based on the associated intra-prediction mode for the respective predetermined intra-predicted block. The predetermined intra-prediction modes of the predetermined subset of predetermined intra-prediction modes can be sorted, for example, in a list. It is possible, that similar intra-prediction modes are grouped together. Using the predetermined rule, for each partition, a predetermined intra-prediction mode near a block global predetermined intra-prediction mode in the list can be determined. Thus local variations of the intra prediction mode for each partition can be considered. Additionally, the decoder/encoder is configured to intra-predict each partition of the respective predetermined intra-predicted block using the partition-specific intra prediction mode determined for the respective partition, for each of predetermined intra-predicted blocks the associated intra-prediction mode of which is contained within a predetermined subset of predetermined intra-prediction modes.

Furthermore, the decoder/encoder is configured to derive/encode, from/into the data stream, for each block, an information on a prediction residual for the respective block, by deriving/encoding the prediction residual for each predetermined intra-predicted block by deriving/encoding, from the data stream, for each partition of the respective predetermined intra-predicted block, a partition-specific prediction residual signal related to a spatial domain prediction residual signal of the respective partition of the respective predetermined intra-predicted block via a predetermined transform.

Additionally, the decoder is configured to reconstruct each block using the information on the prediction residual for the respective block and a prediction signal obtained using the prediction type assigned to the respective block. For each block, encoded by the encoder, the respective block is reconstructable using the information on the prediction residual for the respective block and a prediction signal obtained using the prediction type assigned to the respective block.

BRIEF DESCRIPTION OF THE DRAWINGS

Embodiments of the present invention will be detailed subsequently referring to the appended drawings, in which:

FIG. 4 shows a schematic view of a usage of a secondary transform per partition of a block of a picture to be decoded, according to an embodiment;

FIG. 8 shows a schematic view of a usage of partition-specific angular intra prediction modes, according to an embodiment;

FIG. 15 shows a coding unit syntax, according to an embodiment.

DETAILED DESCRIPTION OF THE INVENTION

Figure 1:
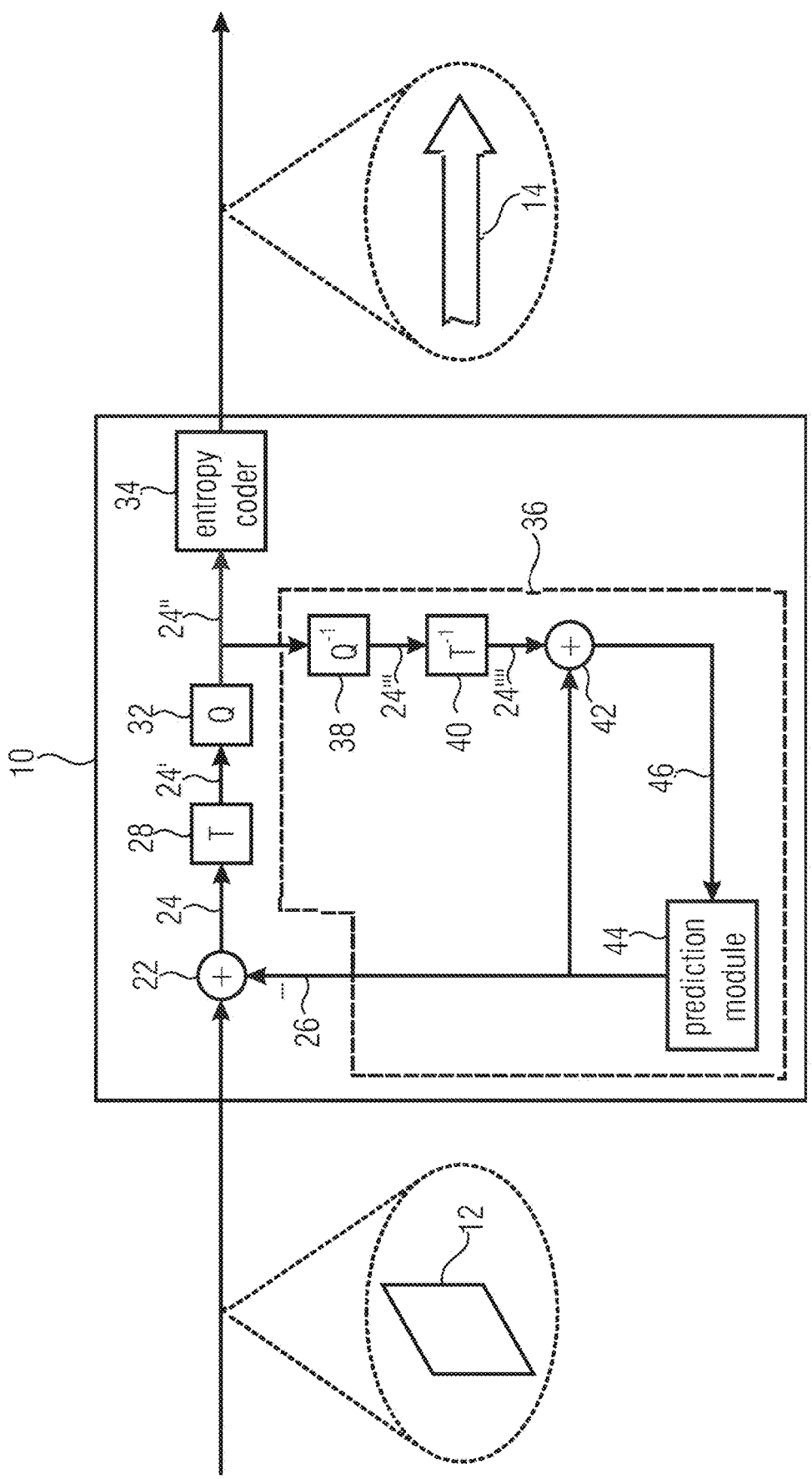
FIG. 1 shows a schematic view of an encoder.

Equal or equivalent elements or elements with equal or equivalent functionality are denoted in the following description by equal or equivalent reference numerals even if occurring in different figures.

In the following description, a plurality of details is set forth to provide a more throughout explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described herein after may be combined with each other, unless specifically noted otherwise.

The following description of the figures starts with a presentation of a description of an encoder and a decoder of a block-based predictive codec for coding pictures of a video in order to form an example for a coding framework into which embodiments of the present invention may be built in. The respective encoder and decoder are described with respect to FIGS. 1 to 3. Thereinafter, with respect to the FIGS. 4 to 8, the description of embodiments of the concept of the present invention is presented along with a description as to how such concepts could be built into the encoder and decoder of FIGS. 1 and 2, respectively, although the embodiments described with the subsequent FIG. 4 and following, may also be used to form encoders and decoders not operating according to the coding framework underlying the encoder and decoder of FIGS. 1 and 2.

Figure 2:
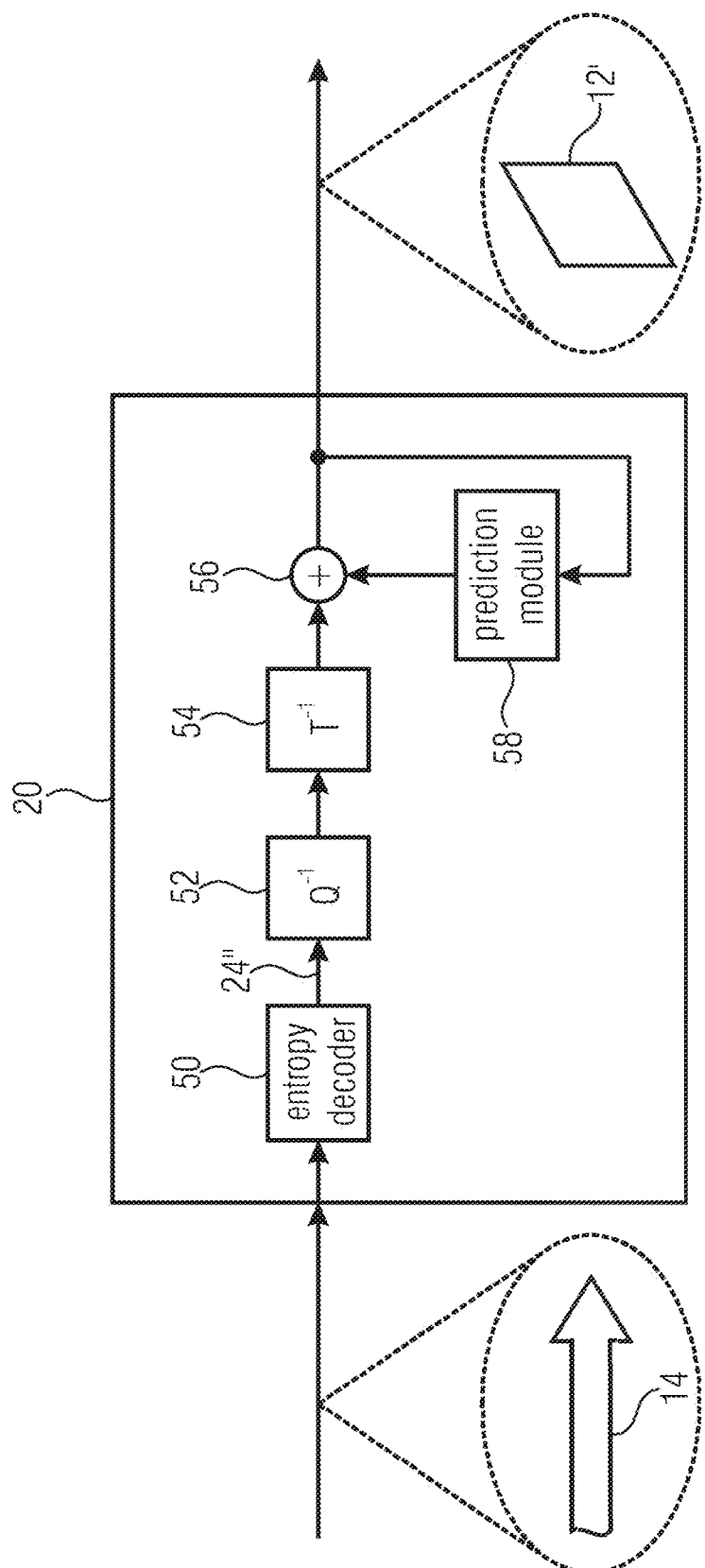
FIG. 2 shows a schematic view of a decoder.

FIG. 1 shows an apparatus (e. g. a video encoder) for predictively coding a picture 12 into a data stream 14 exemplarily using transform-based residual coding. The apparatus, or encoder, is indicated using reference sign 10. FIG. 2 shows a corresponding decoder 20, i.e. an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 1 and FIG. 2 exemplarily use transform based prediction residual coding, although embodiments of the present application are not restricted to this kind of prediction residual coding. This is true for other details described with respect to FIGS. 1 and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal, thus obtained, to spectral-to-spatial transformation.

Internally, the encoder 10 may comprise a prediction residual signal former 22 which generates a prediction residual 24 so as to measure a deviation of a prediction signal 26 from the original signal, i.e. from the picture 12, wherein the prediction signal 26 can be interpreted as a linear combination of a set of one or more predictor blocks according to an embodiment of the present invention. The prediction residual signal former 22 may, for instance, be a subtractor which subtracts the prediction signal from the original signal, i.e. from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24" is coded into bitstream 14. To this end, encoder 10 may optionally comprise an entropy coder 34 which entropy codes the prediction residual signal as transformed and quantized into data stream 14.

The prediction signal 26 is generated by a prediction stage 36 of encoder 10 on the basis of the prediction residual signal 24" encoded into, and decodable from, data stream 14. To this end, the prediction stage 36 may internally, as is shown in FIG. 1, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra-picture prediction, and/or temporal prediction, i.e. inter-picture prediction.

Likewise, decoder 20, as shown in FIG. 2, may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24'' so that, as shown in FIG. 2, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded.

Intra-coded blocks are predicted on the basis of a spatial, already coded/decoded neighborhood (e. g. a current template) of the respective block (e. g. a current block) as is outlined in more detail with regard to FIGS. 4 to 8. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples.

Compared thereto, inter-coded blocks may be predicted, for instance, temporally. For inter-coded blocks, motion vectors may be signaled within the data stream 14, the motion vectors indicating the spatial displacement of the portion of a previously coded picture (e. g. a reference picture) of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24", data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

Figure 3:
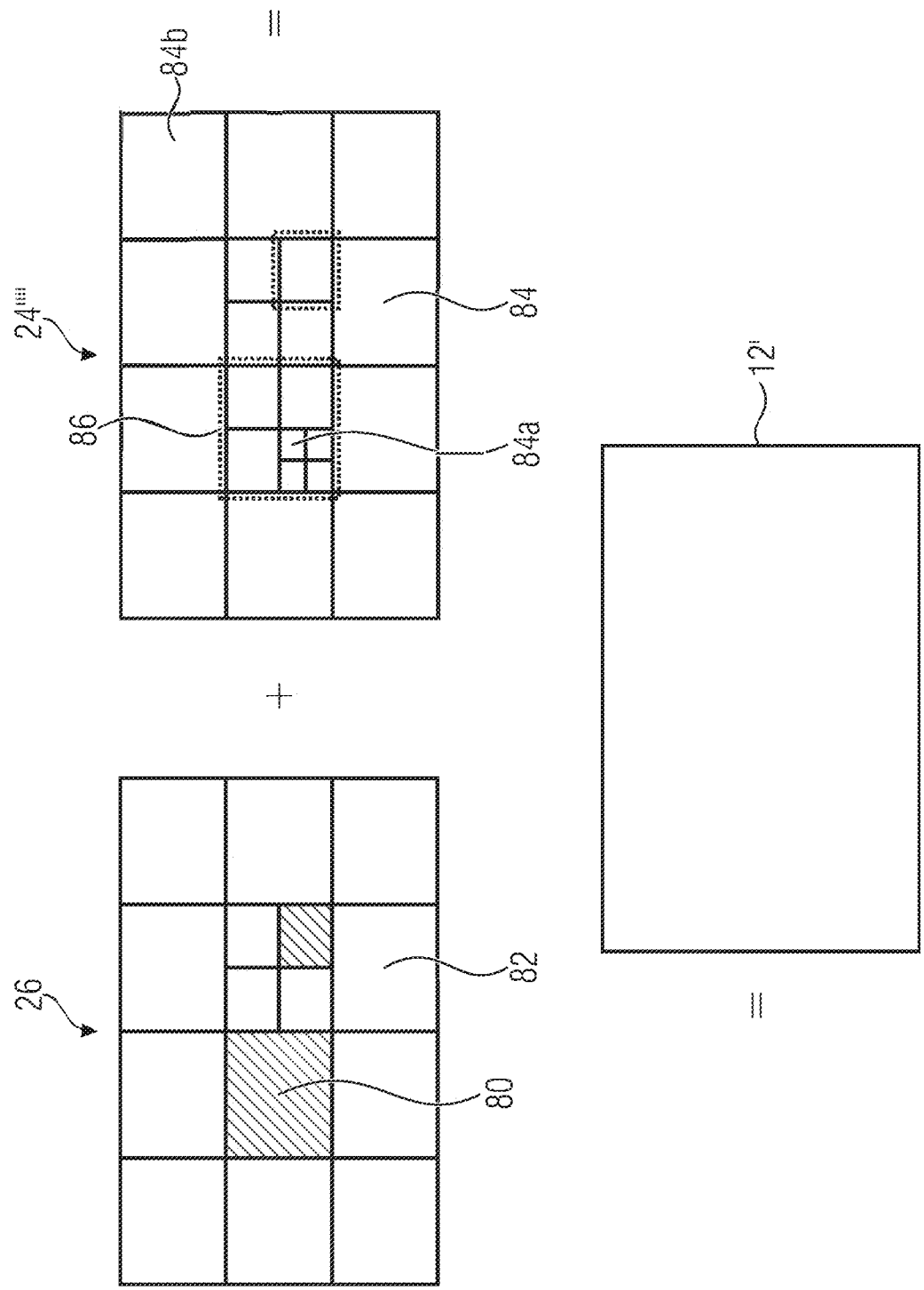
FIG. 3 shows a schematic view of a block based reconstruction of a picture by a decoder.

FIG. 3 illustrates the relationship between the reconstructed signal, i.e. the reconstructed picture 12', on the one hand, and the combination of the prediction residual signal 24" as signaled in the data stream 14, and the prediction signal 26, on the other hand. As already denoted above, the combination may be an addition. The prediction signal 26 is illustrated in FIG. 3 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 3 in which the picture area is first subdivided into rows and columns of tree root blocks which are then further subdivided in accordance with a recursive multi-tree subdivisioning into one or more leaf blocks.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or a hierarchically lower layer in the case of encoder and decoder being scalable encoders and decoders, respectively.

The prediction residual signal 24'''' in FIG. 3 is also illustrated as a subdivision of the picture area into blocks 84. These blocks might be called transform blocks in order to distinguish same from the coding blocks 80 and 82. In effect, FIG. 3 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, i.e. each coding block 80 and 82, may concurrently form a transform block 84, but FIG. 3 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, i.e. the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks residual signal, 82 and 84 are not restricted to being of quadratic, rectangular or any other shape.

FIG. 3 further illustrates that the combination of the prediction signal 26 and the prediction residual signal 24'''' directly results in the reconstructed signal 12'. However, it should be noted that more than one prediction signal 26 may be combined with the prediction residual signal 24'''' to result into picture 12' in accordance with alternative embodiments.

In FIG. 3, the transform blocks 84 shall have the following significance. Transformer 28 and inverse transformer 54 perform their transformations in units of these transform blocks 84. For instance, many codecs use some sort of DST (discrete sine transform) or DCT (discrete cosine transform) for all transform blocks 84. Some codecs allow for skipping the transformation so that, for some of the transform blocks 84, the prediction residual signal is coded in the spatial domain directly. However, in accordance with embodiments described with regard to FIGS. 4 to 8, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform

DST-IV, where DST stands for Discrete Sine Transform.

DCT-IV

DST-VII

Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)

Inverse DST-IV

Inverse DCT-IV

Inverse DST-VII

Identity Transformation (IT)

The subsequent description provides more details on which transforms could be supported by encoder 10 and decoder 20. In any case, it should be noted that the set of supported transforms may comprise merely one transform such as one spectral-to-spatial or spatial-to-spectral transform, but it is also possible, that no transform is used by the encoder or decoder at all or for single blocks 80, 82, 84.

As already outlined above, FIGS. 1 to 3 have been presented as an example where the inventive concept described with regard to FIGS. 4 to 8 may be implemented in order to form specific examples for encoders and decoders according to the present application. Insofar, the encoder and decoder of FIGS. 1 and 2, respectively, may represent possible implementations of the encoders and decoders described herein. FIGS. 1 and 2 are, however, only examples. An encoder according to embodiments of the present application may, however, perform block-based encoding of a picture 12 using the concept outlined in more detail with regard to FIGS. 4 to 8 and being different from the encoder of FIG. 1 such as, for instance, in that the intra-coded blocks 80 are further subdivided into partitions and/or in that the subdividing into the partitions is performed by a horizontal split and a vertical split for single intra-coded blocks 80 and/or in that first and secondary transforms are used for partitions of single intra-coded blocks 80 and/or in that individual intra prediction modes are used for partitions of single intra-coded blocks 80. Likewise, decoders according to embodiments of the present application may perform block-based decoding of picture 12' from data stream 14 using the coding concept further outlined with regard to FIGS. 4 to 8, but may differ, for instance, from the decoder 20 of FIG. 2 in that the intra-coded blocks 80 are further subdivided into partitions and/or in that the subdividing into the partitions is performed by a horizontal split and a vertical split for single intra-coded blocks 80 and/or in that first and secondary transforms are used for partitions of single intra-coded blocks 80 and/or in that individual intra prediction modes are used for partitions of single intra-coded blocks 80.

According to an aspect, as shown in FIG. 4, the data stream 112, into which picture 110 is coded, may convey information 112a which is inserted into data stream 112 by the encoder and on the basis of which the decoder derives the assignment of the picture 110 at a granularity of blocks into which the picture is sub-divided to the set 114 of prediction types. That is, information 112a would assign each of blocks of picture 110 to one out of the set 114 of prediction types. The set 114 of prediction types comprises, as described above, intra-prediction 116 and inter-prediction 118 so that each block is assigned to an associated prediction type out of set 114. For each intra-predicted block 120, i.e., for each block assigned to intra-prediction 116, data stream 112 comprises information 112c which is inserted by the encoder and from which the decoder derives for the respective intra-predicted block 120 as to which intra-prediction mode out of set 122 of intra-prediction modes the respective intra-predicted block 120 is associated with. For each of predetermined intra-predicted blocks 120, namely those the associated intra-prediction mode of which is contained within a subset 124 of predetermined intra-prediction modes, the data stream 112 further comprises information 112d which is inserted by the encoder into the data stream 112 so as to enable the decoder to derive therefrom the partitioning 128 of the respective predetermined intra-prediction block 120 into the partitions 130. Note that not every intra-predicted block needs to be a predetermined one. Rather, as described above and further below, information 112b conveyed in the data stream for intra-predicted blocks may decide whether a certain intra-predicted block is a predetermined one, namely an ISP block, or not. Similarly, the subset of intra-prediction modes needs not to be a proper subset, but all intra-prediction modes of set 122 may also be member of subset 124. The set 122 can comprise angular intra-prediction modes 123a, planar intra-prediction modes 123b, DC intra-prediction modes 123c and/or block-based intra-prediction modes 123d. The subset 124 comprises, for example, angular intra-prediction modes 123a, planar intra-prediction modes 123b and/or DC intra-prediction modes 123c.

Different possibilities for partitionings are illustrated in FIG. 4. Based on the partitioning 128 for the respective predetermined intra-predicted block 120, each partition 130 of the respective predetermined intra-predicted block 120 is intra-predicted in a manner depending on the predetermined intra-prediction mode assigned to the respective predetermined intra-predicted block to obtain a partition specific prediction signal. Some examples for intra-prediction modes were presented above and further details are briefly set out herein below.

The data stream 112 additionally comprises for each block information 112e on a prediction residual for the respective block. For each predetermined intra-prediction block 120, this is conveyed in the data stream in the following manner. In particular, the data stream 112 comprises for each partition 130 of the respective predetermined inter-predicted block 120, a partition-specific prediction residual signal 132 which is related to a spatial domain prediction residual signal 134 of the respective partition 130 via a predetermined transform T. An information 136 within data stream 112 is inserted into the data stream by the encoder and derived therefrom from the decoder for the respective predetermined intra-predicted block, and identifies the predetermined transform T out of a set 138 of transforms. The information 136 is, for example derived by reading a transform syntax element 112f transmitted in the data stream 112 for the respective predetermined intra-predicted block 120. The transform syntax element 112f can be signaled in the data stream 112 block globally or for each partition 130 of the respective predetermined intra-predicted block 120. The information 136 which identifies the predetermined transform T out of the set 138 of transforms can be derived per partition 130 or block 120 globally. The set 138 of transforms includes, at least, a first transform T1 and a second transform T2 wherein the second transform T2 corresponds to a concatenation of a primary transform T1/Tp and a secondary transform Ts applied onto a subset 140 of transform coefficients of the primary transform T1/Tp. The primary transform Tp may be the first transform T1. The first transform T1 and/or the primary transform Tp may be a separable transform such as a DCT or DST and the secondary transform may be a non-separable transform. On the basis of the information on the prediction residual and the prediction signal, each block is then reconstructible by the decoder using the prediction type assigned to the respective block. That is inter-predicted blocks derive the prediction signal by inter-prediction and for intra-predicted blocks, the prediction signal is obtained by intra-prediction.

The transform syntax element 112f can be represented by a secondary transform flag and/or by a secondary-transform-indicating syntax element. The secondary transform flag can indicate whether the predetermined transform is the first transform T1 or the second transform T2 and the secondary-transform-indicating syntax element can indicate the secondary transform Ts to be used in case of the predetermined transform being the second transform T2.

According to an embodiment, the decoder/encoder is configured to decide between the predetermined transform T being the first transform T1 and the second transform T2 and between different secondary transform candidates to determine the secondary transform Ts at different ones of block level and partition level. Thus the predetermined transform T can be the first transform T1 or the second transform T2, wherein the secondary transform Ts for the second transform T2 can be selected out of different secondary transform candidates to determine the secondary transform Ts at different ones of block level and partition level.

Before proceeding with the description of various possibilities for signaling the transform information 136 for ISP blocks, some further nodes shall exemplify possible implementations of the description set forth above. For instance, the above-description briefly neglected that intra-predicted blocks not necessarily have to be ISP blocks. That is, frankly speaking, not every intra-predicted block needs to be a predetermined intra-predicted block. This and further implementation details will become apparent from the following brief discussion.

In particular, the decoder and encoder may support different intra-prediction modes, summarized in set 122 in FIG. 4. There may be angular intra-prediction modes 123a according to which reference samples neighboring the area to be intra-predicted, e.g. the whole intra-predicted block for non-ISP intra-predicted blocks and the area of each individual partition 130 for ISP blocks, are used in order to fill the predetermined block 120 so as to obtain an intra-prediction signal for the block. In particular, the reference samples which may be arranged alongside a boundary of the area such as alongside the upper and left hand edge of the area, represent picture content which is extrapolated, or copied, along a predetermined direction into the inner of this area. Before the extrapolation or copying, the picture content represented by the neighboring samples might be subject to interpolation filtering or differently speaking may be derived from the neighboring samples by way if interpolation filtering. The angular intra-prediction modes 123a mutually differ in the intra-prediction direction. Each angular intra-prediction mode 123a may have an index associated with, wherein the association of indexes to the angular intra-prediction modes 123a may be such that the directions, when ordering the angular intra-prediction modes 123a according to the associated mode indexes, monotonically rotate clockwise or anticlockwise.

There may also be non-angular intra-prediction modes, such as a planar intra-prediction mode 123b, according to which a two-dimensional linear function defined by a horizontal slope, a vertical slope and an offset is derived based on the afore-mentioned neighboring samples neighboring the area to be intra-predicted, with this linear function defining predicted sample values in the inner of the area to be intra-predicted, i.e. the whole block 120 or the area of a certain partition 130. Horizontal slope, vertical slope and offset are derived on the basis of the neighboring samples.

A specific non-angular intra prediction mode 123c, the DC mode, may be contained in set 122. Here, one value, quasi a DC value, is derived on the basis of the neighboring samples and this one DC value is attributed to all samples in the inner of the area to be intra-predicted, i.e. the whole block 120 or the area of a certain partition 130 so as to obtain the intra-prediction signal. Although two examples for a non-intra-prediction mode are shown, merely none, one or more than two may be present in set 122.

The intra-prediction modes 123a-c form the subset 124 of intra-prediction modes which are supported by encoder and decoder. They may optionally, as illustrated in FIG. 4 at 123d, compete, in terms of rate/distortion optimization sense, with block-based intra-prediction modes indicated using reference sign 123d. According to these block-based intra-prediction modes 123d, a matrix-vector product between a vector which is derived from the neighboring samples on the one hand and a predetermined prediction matrix on the other hand may be used so as to result into a prediction vector which is used to predict the samples within the area to be intra-predicted. Such block-based intra-prediction modes 123d, if present, may mutually differ in the prediction matrix associated with the respective mode. Thus, briefly summarizing, encoders and decoders according to embodiments described herein may comprise a set 124 of intra-prediction modes 123a-123d.

An intra-predicted block 120 may be coded/decoded using intra-prediction in the following manner. For example, the mode indication 112c may be done in the following manner. In particular, in case of block-based prediction modes 123d being supported, a set-selecting syntax element or information 112b—it could be named intra_mip_flag—may be conveyed in the data stream 120 to indicate whether the block 120 is to be predicted using any of the subset 124 of intra-prediction modes, or any of modes 123d. Information 112b is indicated in FIG. 4 extra relative to information 112c. It should be noted that from one point of view, information 112b and 112c act together to indicate the intra-prediction mode for block 120 out of set 122, but as block 120 in FIG. 4 is assumed to be an ISP block, the mode of the block is already known to be in set 124, and information 112c is sufficient to indicate the block's 120 mode.

If information 112b indicates that the block 120 is to be predicted using any mode of subset 124, information 112c may be signalled in the following manner. A list of most probable candidates out of set 124 may be construed/formed at decoder and encoder on the basis of intra-prediction modes using which neighboring blocks, which neighbor block 120, have been predicted. The neighboring blocks may be determined relative to the position of block 120 in a predetermined manner such as by determining those neighboring blocks which overlay certain neighboring samples of block 120 such as the sample to the top of the upper left hand sample of block 120, and the block containing the sample to the left of the just-mentioned corner sample. Naturally, this is only an example. The same applies to the number of neighbouring blocks used for mode prediction which is not restricted to be two for all embodiments. More than two or just one may be used. If any of these neighboring blocks is missing, a default intra-prediction mode out of set 124 may be used by default as a substitute for the intra-prediction mode of that missing neighbouring block. The same may apply if any of the neighboring blocks has been coded/decoded using an inter-prediction mode such as by motion compensated prediction. The construction of the list of most probable modes out of set 122 may be such that the list-length, i.e., the number of most probable modes therein, may be fixed by default. An index in the data stream may indicate one mode out of this list to be used for block 120. The indexing is performed along a list order or ranking with a list index being, for instance, variable length coded so that the length of the index increases monotonically along order 530. The list index would form a part of information 112c. It is worthwhile to, firstly, populate to most probable mode list with the most probable modes out of set 124 only, and to place, along the list order, modes more probable upstream relative to modes having lower probability of being suitable for intra-predicted block 120. When the modes of the list are derived based on the modes used for neighboring blocks it might be that any of the latter has been intra-predicted using a block-based mode 123d. In that case, a mapping from block-based modes 123d onto the modes within set 124 may be used for list construction. If the set-selective syntax element 112b indicates that the predetermined block 120 is to be coded by any mode out of set 124, optionally an MPM syntax element—it may be called intra_luma_mpm_flag—may be part of information 112c which indicates whether the intra-prediction mode to be used for predetermined block 18 is within the MPM list and if yes, then the data stream 112 comprises the just-mentioned list index—it may be called intra_luma_mpm_idx—into the MPM list indicating the mode to be used for predetermined block out of the MPM list by indexing same along the list order. If, however, the mode out of set 124 is not within MPM list, then the data stream 112 comprises for block 120 as part of information 112c a further syntax element—it may be called intra_luma_mpm_remainder—indicating which mode is to be used for block 120 out of set 124. This syntax element may indicate the mode in a manner by merely distinguishing between those modes out of set 124, which are not contained in the MPM list.

In the other case, i.e., in the case where information 112b indicates that the pre-determined block 120 is to be predicted using any of the block-based intra-prediction modes 123d, the coding of block 120 into data stream and the decoding therefrom may be done. To this end, indexing may be used in order to index the selected one out of, or indicate as to which of, the block-based intra-prediction modes 123d is to be used. Another MPM list construction may be used to this end, along with information indicative whether the selected mode among modes 123d is within that MPM list, if yes, which one therein is the selected one, and if not, which mode among modes 123*d* else the mode of block 120 is.

Further syntax elements or further information may be included in the data stream in case of block 120 being coded using any among the modes within subset 124, i.e. potentially being a predetermined intra-predicted block, which further syntax elements somehow parametrize the intra-prediction modes within set 124. Optionally, a syntax element—it may be called intra_luma_ref_idx—may parametrize or vary a region where the afore-mentioned reference samples around block 120 are positioned based on which the modes in set 124 are used to intra-predict the inner of block 120, such as in terms of distance towards block's 120 outer circumference. A syntax element which may be part of information 112*b* or may be illustrated in FIG. 4 using this reference sign, and which may be called intra_subpartitions_mode_flag—may indicate whether block 120 is an ISP block, i.e. it parametrizes whether the afore-mentioned reference samples are used by the selected mode out of set 124 to intra-predict the inner of block 120 globally or en block, or whether the intra-prediction is done in units of partitions 130 into which the block 120 is sub-divided, and which are intra-predicted sequentially so that the prediction residual coded into the data stream for one partition 130 may serve for recruiting/reconstructing new reference samples for intra-predicting a following partition 130. The ISP coding option controlled by the just mentioned ISP syntax element 112*b* may, in accordance with an optional embodiment, be available only (and the corresponding syntax element may be present in the data stream only) if the optionally present syntax element controlling the location of the reference samples has a predetermined state corresponding to, for instance, the region, where the reference samples lie, abutting the block 120.

The partitions 130 may be defined by subdividing the block 120 along a predetermined direction such as either horizontally, thereby leading to partitions 130 being as high as block 120, as indicated at 127*b*, or vertically, thereby leading to partitions 130 being as wide as block 120, as indicated by 127*a*. Optionally, it could be feasible to indicate one or more other partitionings 127*c* as well such as a splitting into n×n partitions 130. A syntax element as part of information 112*d* may be present in the data stream if the partitioning is signaled to be active for the block 120, i.e. if block 120 is an ISP block as explained, this syntax element 112*d* may control as to which split direction is used.

Figure 6:
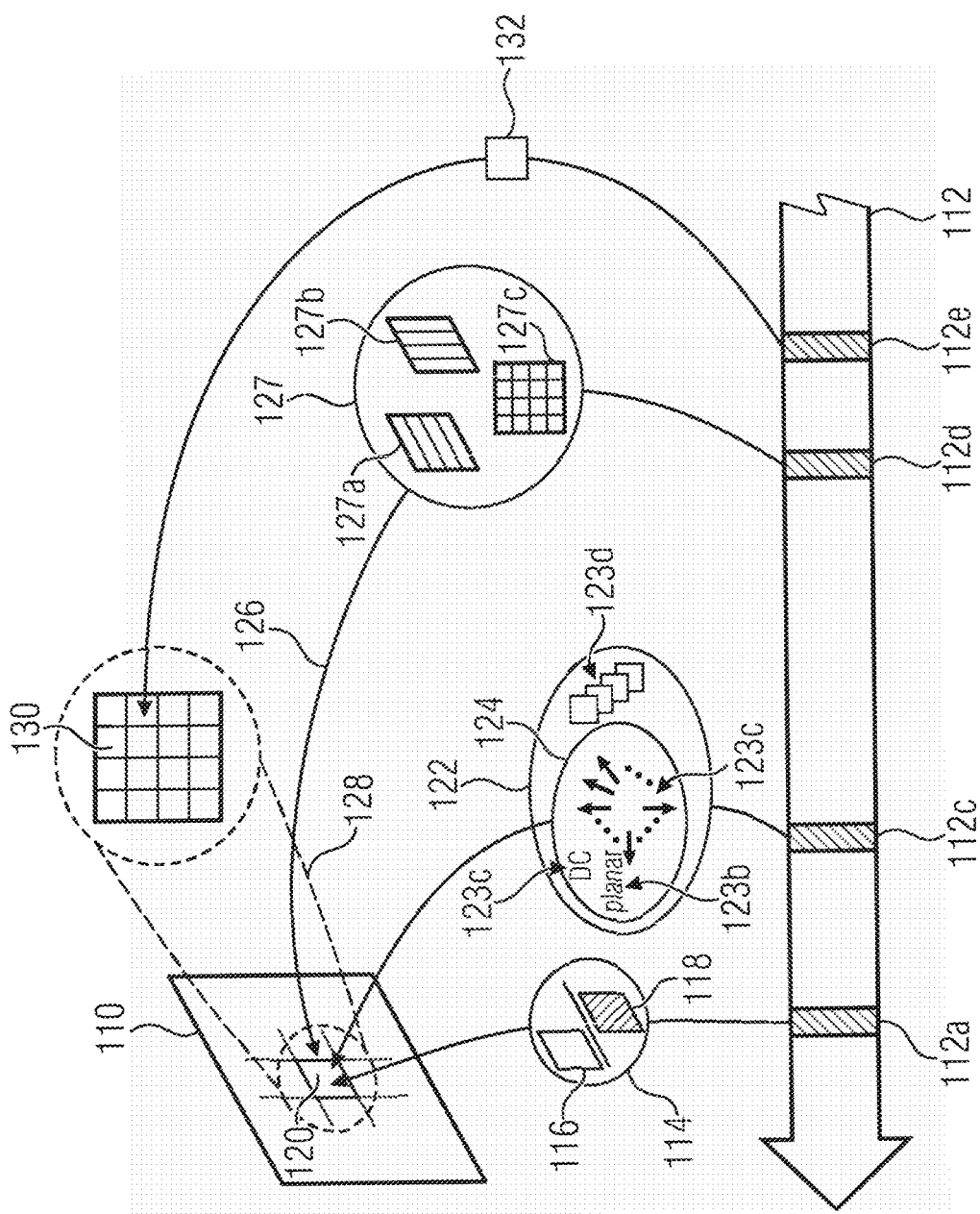
FIG. 6 shows a schematic view of a usage of a third partitioning of a block of a picture, according to an embodiment.

According to an embodiment, the partitioning 128 of the block 120 may be performed as described with regard to FIG. 6.

Now let's precede the description with respect to the residual coding for an ISP block 120. That is, the block 120 is signaled to be partitioned according to the selected partitioning 126 into partitions 130 and for each partition 130, the data stream 112 has encoded thereinto a partition-specific residual signal 112*e* with a decoder decoding the residual signal for partition 130 therefrom. As described, the decoder uses the spatial-domain residual signal 134 derived from signal 132 so as to correct the prediction signal derived for the respective partition 130 using the intra-prediction mode signaled for the ISP block 120, whereupon the next partition may be intra-predicted using reference samples which neighbor this next partition and partially reside, for instance, in the previous partition. The partition-specific residual signal 132 is conveyed in the data stream in transform domain. Which transform T underlies the partition-specific signal 132 is signaled in the data stream using information 112*f* in any of the manners described herein such as partition-by-partition so that the transform T may differ among partitions 130 of one ISP block 120. Before describing the different embodiments in this regard, however, it is briefly described as to how the partition-specific residual signal 132 is coded into the data stream 112, i.e., as to how the information 112*e* in the data stream 112 could look like which indicates the partition-specific residual signal 132.

In particular, information 112*e* may comprise, for each partition 130, a Coded Block Flag (CBF), a Last Position (LP) syntax element and a coding of transform coefficient levels of transform coefficients forming the transform domain signal 132 of the respective partition 130. Therefore, for an ISP block 120, with K partitions 130, there may be K CBFs and one LP for each partition 130 with a non-zero CBF. The context used to code each CBF may depend on the value of the CBF of a previously coded partition 130 within the same block 120—along the order at which partitions are subject to prediction. As the transform T for a certain partition 130, a 2-D transform may be used, except in the case that one of the dimensions of that partition 130 is one (sample wide), in which case a 1-D transform will be applied. The decoder is, thus, able to obtain the transform coefficient levels of the transform T for each partition 130, subject same to the inverse transform to obtain the prediction residual samples for each partition 130 in spatial domain as shown at 134.

In accordance the ISP scheme, i.e. partitioning into partitions 130, it may be that this scheme is available for a current intra-coded block only provided that certain one or more conditions are fulfilled. The one or more conditions could, for instance, comprise: the intra-coded block needs be to greater than some minimum size in terms of, for instance, number of samples of block, and/or the intra-coded block may not be allowed to exceed a certain dimension, at least both horizontally and vertically, in order to, for instance, not lead to too large transform sizes. To be more precise, it could be that the ISP mode is available only in case of intra-coded block being smaller than or equal to the just-mentioned maximum transform-related size in at least one direction, i.e., horizontally or vertically. Thus, an intra_subpartitions_mode_flag signaling the ISP mode as part of information 112*b* for an intra-coded block may only be present in the data stream in case of the block fulfilling the just-mentioned conditions. Otherwise, the decoder may infer that the intra-coded block is intra-coded un-partitioned. A partition dimension flag as part of information 112*d*—it may be called intra_subpartitions_split_flag—may further be signaled for the intra-coded block 80, in case of the intra_subpartitions_mode_flag indicating that the intra-coded block 80 is an ISP coded block. It might be, however, that this intra_subpartitions_mode_flag is not explicitly signaled inevitably, but inferred to indicate a certain partition dimension in case of certain situations. For instance, in case of the intra-coded block having a width which exceeds the aforementioned maximum transform size (but having a height which does not), then the partition dimension could be obliged to be horizontal, and in case of the height of block exceeding the just-mentioned maximum transform size (but the width not exceeding the same), dimension could be obliged to be vertical. In both cases, the intra_subpartitions_split_flag would not be signaled explicitly in the data stream, but inferred accordingly by the decoder. Further, encoder and decoder may determine the number of partitions 130 block 120 is split into, depending on the size of block 120. No signal would then have to be spent in the data stream. For small block sizes, the number could be two, whereas the number of partitions 130 may be four otherwise. The partition order at which intra prediction of the partitions 130 and the coding of the prediction residuum in the data stream are performed, may lead along the partition direction from the left most partition in case of a horizontal direction such as illustrated at 127b and the uppermost partition in case of a vertical partitioning 127a to the farthest partition. No signaling would be spent for this either.

The residual transformation 112e could be done, as described above, per partition 130. That is, each partition 130 could be transformed separately using some transform T.

As an intermediary note it should be noted that, in case of a non-ISP intra-coded block, the number of transforms could depend on the size of block, too: if the non-ISP intra-coded block is smaller than the aforementioned maximum transform size horizontally and vertically, the intra-coded block's residual is coded using one transform, i.e., the block's residual is completely subject to one transform. This may not happen in case of an ISP block as the latter is transformed partition-wise. In case of exceeding the maximum transform size horizontally, the non-ISP intra-coded block is split into two halves or a corresponding number of transform blocks horizontally so that the halves or the transform blocks meet the maximum transform size and the residuum of block is subject to one transform per half/transform block. The same applies in case of the block exceeding the maximum transform size vertically. If exceeding the maximum transform size both vertically and horizontally, four or a corresponding number of transforms are used to transform the residuum of block in the four quadrants of this block or a regular 2-dimensional sub-division of block into a corresponding number of transform blocks. Naturally, the treatment of non-ISP intra-coded blocks deviates from the handling of ISP intra-coded blocks 120 in other way. For instance, explicit signalization such as a split flag is not used in case of non-ISP intra-coded blocks. In accordance with an embodiment, the non-ISP intra-coded blocks are intra-predicted en block whereas ISP blocks are intra-coded per partition in a sequential manner. Further differences may relate to the coding of the transform's for coding the prediction residual. For each transform, i.e. for each partition 130 in case of an ISP block and each transform in case of a non-ISP intra coded block, a coded block flag CBF such as tu_cbf_luma, is transmitted, but while for non-ISP intra-coded blocks this flag might be coded inevitably for each transform, this flag may be inferred to be one for the transform of the last partition 130 of that block 120 in case of all previous CBFs for the previous transforms/partitions being zero.

Some notes shall be made as to variations of above description. For instance, although a sequential intra-coding of the partitions including taking into account a prediction residual of a previous partition in intra-coding a current partition has been described, above embodiments may be varied in that the intra-prediction is done for all or a subgroup of partitions on the basis of reference samples lying outside the ISP block, quasi en block, whereas the partition-based treatment of ISP blocks relates solely to the partition based transform coding. Note that the just mentioned variations may be mixed to result into embodiments where encoder and decoder use different of the above variations for different block sizes so that, for instance, there are blocks of a size for which partition-wise intra-prediction is used when being ISP coded, and bocks of a different size for which block-wise or partition-group-wise intra-prediction is used when the block is ISP coded. Moreover, as often mentioned above, the signaling presented above is merely illustrative and may be done differently. The signaling via usage MPM lists, for instance, is merely illustrative and may be done without such MPM lists. Further, the signaling order and mutually conditioning among the above presented syntax elements may be varied.

In the following a Low Frequency Non-Separable Transform (LFNST) is used as a secondary transform $T_s$. But it is clear, that also other secondary transforms can be used.

The Low Frequency Non-Separable Transform is a secondary transform that is applied only on the top-left corner of the primary transform coefficients, e.g., on the subset 140 of coefficients of the primary transform Tp/T1. In VTM-6.0 there are various LFNST sets that are selected according to the intra mode of the current block. Each LFNST set comprises two different transforms. Therefore, the decoder has 3 options to choose according to an explicitly signaled element (0→do not use the LFNST, 1→use the first LFNST, 2→use the second LFNST). It is possible that in some cases the LFNST is not applicable to the block depending on certain conditions:

Example 1: the primary transform coefficients are not zero in a certain area 160 of the block 120.

Example 2: the resulting transform coefficients after applying the secondary transform violate certain conditions, such as the number of significant coefficients is greater than a certain threshold or the results Last Position syntax element is greater than a certain threshold.

In the aforementioned examples and related cases no signaling is parsed by the decoder and it is inferred that the secondary transform is not applied.

Currently in VTM-6.0 (Intra Subpartitions) ISP cannot use the LFNST. It is proposed to enable this algorithm on blocks using ISP at the Transform Unit (TU) level. That means, if a block using ISP is split into n subpartitions, then each of the resulting subpartitions will, for example, use the LFNST algorithm in the same way as a normal block not using ISP. In subsequent embodiments, different possibilities are described regarding implicit and explicit signalization of LFNST usage and an optional selection among secondary transform candidates and regarding performing any of the just-mentioned decisions/signaling at block level and partition level, respectively.

The Secondary transform $T_s$ is applied at the sub-partition level. Therefore, there is, for example, a syntax element, i.e. the transform syntax element 112f, parsed for each subpartition 130 to decide whether a secondary transform $T_s$ is going to be calculated and in the positive case which one. Naturally, this syntax element can (e.g. only) be parse if the secondary transform conditions are met, e.g., the number of significant coefficients is greater than a certain threshold and/or there are no non-zero coefficients outside the predetermined area.

As outlined above, currently in VTM-6.0 (Intra Subpartitions) ISP cannot use the LFNST. It is proposed herein to enable this algorithm on blocks using ISP. This means that each subpartition 130 of a block 120 using ISP will have the possibility of applying a secondary transform $T_s$. This can be indicated to the decoder explicitly by information 112f with a syntax element, but it could also be implicitly indicated by using parameters that are already present at the decoder or by a combination of implicit and explicit elements. In the following various examples are provided in addition to the ones described above.

In other words, above different possibilities for a combination of ISP with LFNST were shown. Below, variants of signaling or varying the transform T for transform coding the prediction residual of the partitions 130 are outlined hereinbelow.

Explicitly at the Subpartition Level

The secondary transform Ts may be explicitly signaled to the decoder for each subpartition 130. This version simply extrapolates the normal usage of the LFNST to each subpartition 130 created by ISP.

Figure 5:
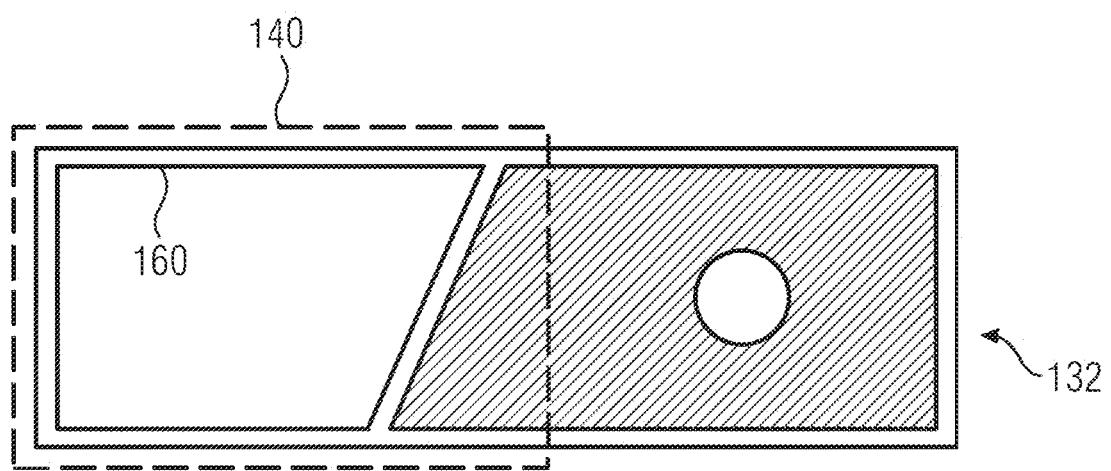
FIG. 5 shows a schematic view of a non-zero transform domain area positioned in a partition of a block of a picture, according to an embodiment.

That is, let's resume the description with respect to the transform coding of the prediction residual 132 per partition 130. As described, the prediction residual 132 may be coded into data stream 112 in transform domain. This transform domain is related to the spatial domain via transform T. In accordance with the variant just-presented, it may be that the information 112$f$ indicates per partition 130 whether this transform T is the first transform T1 or the primary transform Tp/T1 followed by the secondary transform Ts. In other words, for each partition, a transform syntax element 112$f$ is read indicating whether the first transform T1 or the second transform T2 is used for the respective partition. It could be that the secondary transform Ts is fixed by default for block 120, or signaled once for ISP block 120. It might be that, depending on the intra-prediction mode out of set 124 for block 120, two Ts form a set of secondary transform candidates for block 120, and that one is chosen for block 120. The primary transform T1 would be, for instance, fixed by default for ISP block 120. Note that in that case, while sending the decision so as to apply the secondary transform Ts for the whole block 120, the decision merely effects for partitions the residual information 112$e$ of which does not indicate right away that the secondary transform may not be applied due to the above indicated reasons, such as: LFNST is unavailable for a certain partition if one of the following conditions applies to its residual transform as coded by information 112$e$ (and available otherwise): 1) non-zero transform coefficients lie outside a predetermined area 140 (as shown in FIG. 5); 2) the number of non-zero coefficients exceeds some limit; 3) a last non-zero coefficient position along a scan path leading from DC coefficient position to opposite, or highest frequency, coefficient position, as indicated by one or more syntax elements, called LP syntax element herein, for the residual transform of the respective partition, which quasi serves as a measure for an expected count of non-zero coefficients within the transform, exceeds some threshold; or 4) LFNST is unavailable if one out of two or more of conditions 1 to 3, is met; or 5) LFNST is unavailable if each of a subset of conditions out of conditions 1 to 3 are met.

In this regard, it should be recalled what has already been described above. In particular, for the partitions 130 of a block 120, a CBF is transmitted in the data stream on a per-partition basis. The CBF may indicate whether or not a partition, e.g. a transform unit, includes residual information, e.g., information generated through prediction. If same, i.e. the CBF, indicates the residual to be zero, no secondary transform flag 112$f$ needs to be present for the respective partition 130. Further, as has also been described above, the availability of the secondary transform option may depend on certain circumstances: for instance, the LP syntax element described above acts as a non-zero zone indication. It signals for the respective partition 130 a non-zero transform domain area 160, as shown in FIG. 5, wherein all non-zero coefficients of the partition-specific prediction-residual signal 132 are located exclusively and where, accordingly, merely zero coefficients are positioned. Depending on an extension and/or position of this non-zero transform domain area 160, the predetermined transform T is obliged to be equal to the primary transform T1 only, or the secondary transform T2 is available in which case the secondary transform flag 112$f$ is transmitted by the encoder or read by the decoder. For instance, the secondary transform Ts is available only if the non-zero transform domain area 160 does not exceed the portion of transform coefficients of transform T1 onto which the secondary transform Ts is applied, i.e., portion 140 in FIG. 4 or FIG. 5. Thus, whether a secondary transform flag 112$f$ is present for a certain partition 130 is a partition-specific question and while a secondary transform flag may be present for one transform 130 of block 120, it may not be present or absent for another partition 130 of that block 120.

Depending on the extension and/or position of this non-zero transform domain area 160, the decoder can be configured to decide between reading the secondary transform flag 112$f$ transmitted in the data stream 112 for the respective partition 130 from that data stream 112 which indicates whether the predetermined transform T is the first transform T1 or the second transform T2, or infer that the predetermined transform T is the first transform T1. If the non-zero transform domain area 160 is completely positioned inside an area defined by the portion 140 of transform coefficients of transform T1 onto which the secondary transform Ts is applied, the secondary transform flag 112$f$ is read. Otherwise, it is inferred that the predetermined transform T is the first transform T1. Whether the secondary transform flag 112$f$ indicates the first transform T1 or the second transform T2 as the predetermined transform can depend on one or more of the conditions 1 to 5 described above.

Alternatively or additionally, the decision between reading the secondary transform flag 112$f$ and inferring that the predetermined transform T is the first transform T1 may depend on whether the non-zero transform domain area 160 exclusively covers the coefficients 140 of the primary transform Tp/T1 onto which the secondary transform Ts is applied by the concatenation of the primary transform Tp/T1 and secondary transform Ts, and/or depend on a number of non-zero coefficients within the non-zero transform domain area 160.

According to an embodiment, the decoder/encoder is configured to infer that the predetermined transform T is the first transform T1, if dimensions of the partitions 130 fall below a predetermined threshold.

Additionally, a certain flag, i.e. a secondary-transform-indicating syntax element, may be present in the data stream for each of partitions 130 of block 120, for which the secondary transform option is available and is signaled to be applied, namely a flag choosing the secondary transform Ts out of a corresponding set of secondary transforms namely a set comprising two possible secondary transforms. Instead of sending two flags for such partitions 130, a three-array syntax element may be used to indicate the transform used for the respective partition, i.e., as information 112$f$ for that partition 130.

The following is additionally noted before proceeding with a next option for indicating the transform T used for the partitions 130 of block 120. In particular, it is noted that the coding of the transform coefficient levels for a certain partition 130 is restricted to the non-zero portion 160 only. The LP syntax element may indicate a portion by indicating a first non-zero coefficient position when one-dimensionally scanning the transform coefficients of transform T1 from a highest spectral frequency position to the DC frequency position such as the left/top corner of transform T1. The position could be indicated by x and y coordinates in case of a two dimensional T1 transform or as an index measuring the just-mentioned non-zero position as a distance from the DC transform position in units of coefficients along the just-mentioned one-dimensional scan order. Note further, that transform coefficient levels transmitted for a partition 130 in the data stream 112 may be transform coefficients of the first transform T1 or coefficients of the second transform T2, depending on the transform signal to be a combined transform T2 or single transform T1. Note further, that if transform T is signaled to be a two-stage transform, i.e. the second transform T2, of T1 followed by Ts, then the decoder may perform the reversed transform for obtaining the spatial domain residual signal 134 of the respective partition 130 by performing the reverse of the second transform followed by the reverse of transform T1 sequentially or perform the reverse of T2 combined in one reverse transform. In other words, the partition-specific prediction residual signal 132 may be subjected to a reverse transform $T^{-1}$ forming a reversal of the predetermined transform T to obtain the spatial domain residual signal 134.

Explicitly at the Block Level

The Secondary transform Ts could be explicitly signaled to the decoder only once for the whole block 120. That means, all subpartitions 130 within the block 120 will apply the same secondary transform Ts. If the secondary transform flag 112f indicates that the predetermined transform T is the second transform T2, the decoder/encoder can be configured to use the second transform T2 for all partitions 130.

This may imply that certain restrictions of the application of the secondary transform may be applied differently. For example, the aforementioned Example 2 would not be strictly needed in this case, even though it could still be applied. Alternatively, they could also be applied as a whole group or could need a different threshold, etc.

In other words, it may be contained in the data stream 112 a signal 112f once for the whole block 120 which signals whether Ts is applied, i.e. whether T is T1 or T1 followed by Ts, i.e. T2, and if the latter is true, which Ts out of the candidate set of secondary transforms. Availability restrictions for LFNST, i.e. applying Ts, may be tested per partition 130 in which the block 120 global signaling only applies for those partitions 130 where LFNST is available. In case of non-availability of LFNST for all partitions 130, the signaling 112f may be left off for block 120, i.e. the encoder does not encode such an LFNST activating flag for block 120 and the decoder infers that that flag is set to LFNST being deactivated. Even alternatively, only in case of availability for all partitions 130, the signaling 112f may be present for block 120 with inferring the LFNST is not used otherwise. In the latter case, the Ts selective signaling would accordingly only be coded for block 120 if LFNST availability for all partitions 130 applies and the block level LFNST activation signaling indicates LFNST activation for the block 120. The same or other criteria or other thresholds than discussed above in 1 to 5 may be used in the variant of signaling block level activation of LFNST only in case of LFNST availability for all partitions 130 of block 120.

According to an embodiment, the decoder can be configured to decide between reading a secondary transform flag 112f transmitted in the data stream 112 for the respective predetermined intra-predicted block 120 from the data stream 112 which indicates whether the predetermined transform T is the first transform T1 or the second transform T2, or inferring that the predetermined transform T is the first transform T1. This decision may depend on a relative location of the non-zero transform domain area 160, as shown in FIG. 5, relative to the coefficients 140 of the primary transform Tp/T1 onto which the secondary transform is applied by the concatenation of the primary transform Tp/T1 and secondary transform Ts. If the non-zero transform domain area 160 is completely positioned inside an area defined by the transform coefficients 140 of the primary transform Tp/T1 onto which the secondary transform Ts is applied, the secondary transform flag 112f is read. Otherwise, it is inferred that the predetermined transform T is the first transform T1. Alternatively or additionally, the decision may depend on whether the non-zero transform domain area 160 exclusively covers the coefficients 140 of the primary transform Tp/T1 onto which the secondary transform Ts is applied by the concatenation of the primary transform Tp/T1 and secondary transform Ts, and/or depend on a number of non-zero coefficients within the non-zero transform domain area 160. Whether the secondary transform flag 112f indicates the first transform T1 or the second transform T2 as the predetermined transform can depend on one or more of the conditions 1 to 5 described above. Additional to the secondary transform flag 112f a secondary-transform-indicating syntax element may be signal block globally for the respective predetermined intra-predicted block 120 to indicate the precise secondary transform for all partitions 130.

The decoder may be configured to perform the decision once for all partitions 130 of the predetermined intra-predicted block 120, wherein the above described conditions on which the decision may depend on, may be checked for all partitions 130 of the predetermined intra-predicted block 120. According to an embodiment, the decision is performed once for all partitions 130 of the predetermined intra-predicted block 120 by checking for all partitions 130, one or more of the following criteria, and deciding that the secondary transform flag 112f is to be read, if the one or more of the following criteria are met for all partitions 130:
    no non-zero transform coefficient lies outside a predetermined area 140, and/or
    the number of non-zero coefficients exceeds a predetermined limit, and/or
    a last non-zero coefficient position along a scan path leading from DC coefficient position to a highest frequency coefficient position, as indicated by a last position syntax element in the data stream, exceeds a further predetermined threshold.

As will be described in more detail in the additional notes further below, it is possible, that only some of the above criteria have to be met for all partitions 130 and some have to be met for at least one partition 130 of the predetermined intra-predicted block 120, so that the secondary transform flag 112f is to be read.

According to an embodiment, the decoder/encoder is configured to infer that the predetermined transform T is the first transform T1, if dimensions of the partitions 130 fall below a predetermined threshold.

Explicitly Combining the Block and Subpartition Level

It may be that there are explicit syntax elements at both the block and the subpartition level. For example, at the block level may be is signaled that all subpartitions 130 will use a secondary transform Ts or not, e.g. signaled by the secondary transform flag 112f. Then, if the secondary transform Ts is going to be used, each subpartition 130 would explicitly signal which secondary transform would be applied (independently from each other), e.g. by a secondary-transform-indicating syntax element. Naturally, the global activation of LFNST may affect partitions 130 of block 120 only whose residual information 112e meets the condition for LFNST availability. The corresponding activation may be coded into the data stream only for block 120 if the condition for LFNST availability is met for at least one partition. And only for those partitions, a syntax element would be coded which explicit selects Ts. Alternatively, only in case of availability for all partitions 130, the signaling 112f may be present for block 120 with inferring the LFNST is not used otherwise. That is, block level LFNST activation signaling would be signaled only if LFNST availability applies for all partitions, and accordingly, for each partition, a Ts selection signaling would be contained in the data stream for block 120.

That is, instead of signaling per partition 130 for which LFNST is available, whether Ts is applied, and if yes, which one out of the set of Ts candidates which is determined for the ISP block, should be used as Ts, it could alternatively be that the primary transform T1 is fixed for all partitions 130 of block 120 and that the information 112f signals the decision whether LFNST is applied for partitions 130 of block 120 for which LFSNT would be available from point of view of the other factors described above (location of the non-zero portion and/or number of non-zero coefficients and/or the position of the last non-zero coefficient), block globally only once, while varying the secondary transform Ts for each partition 130 for which LFSNT is available, if LFNST is signaled to be applied for partitions 130 of block 120, by way of coding a respective Ts-choosing syntax element per such partition.

In all explicit signaling cases (e.g., explicitly at the subpartition level and/or explicitly at the Block level and/or explicitly combining the Block and subpartition level), the decoder/encoder may be configured to select a subset of one or more candidate secondary transforms Ts out of a set of candidate secondary transforms Ts in a manner dependent on the associated intra prediction mode, i.e. the intra prediction mode chosen for the block 120 out of the set 122 or the subset 124. If the subset of one or more candidate secondary transforms Ts contains more than one candidate secondary transform Ts, select the secondary transforms Ts out of the subset of one or more candidate secondary transforms Ts depending on the secondary-transform-indicating syntax element transmitted in the data stream 112 for the respective predetermined intra-predicted block 120.

According to an embodiment, the set of candidate secondary transforms is disjoint of secondary transforms Ts used by the decoder/encoder for other intra-predicted blocks which are intra-predicted un-partitioned.

Implicitly

The decoder could use existing elements at the moment when the coefficients are decoded to gain the information 136 on the transform to be used, i.e. decide whether a secondary transform is applied for each subpartition 130. Examples of these parameters are the subpartition index, the subpartition size, the block size, the intra mode, etc.

The decoder/encoder may be configured to decide between the predetermined transform T being the first transform T1 or the second transform T2 for each partition 130 depending on a rank of the respective partition 130 along an order at which the partitions 130 are subject to intra-prediction 116, a size of the respective partition 130, a size of the predetermined intra-predicted block 120 and/or the associated intra-prediction mode 122. The result of this decision may be signaled by the secondary transform flag 112f in the aforementioned explicit signaling. The precise secondary transform Ts can be selected depending on the associated intra-prediction mode 122, a partition size, a block 120 size, a partition 130 processing rank and/or the partitioning 128. This selection may be performed once for all partitions 130 of the predetermined intra-predicted block 120 or per partition 130 of the predetermined intra-predicted block 120.

Mixed Implicitly/Explicitly

Any of the aforementioned examples or related versions of them could be combined with implicit rules. For example, the usage or not of a secondary transform could be decided explicitly, but the decision on which secondary transform is to be used could be derived implicitly by using the intra mode, the subpartition size, the block size, the subpartition index, the ISP split type (horizontal or vertical), etc.

Additional Notes

The following details and examples are added to the above description. For instance, another example for a condition regarding the availability of the LFNST is added. To be more precise, in the case of explicitly signaling secondary transform usage/activation at the block level it might be that the availability of the LFNST or, to be more precise, the transmitting of the secondary transform flag 112f for the block 120 so as to block globally activate the secondary transform Ts, may be defined by more than one condition a), b), c), etc. This had already been described. For instance, it might be that more than one condition such as more than one of the above listed ones 1 to 5, are to be met for all of the block's partitions 130. Alternatively, more than one condition might have to be true or met in at least one of them. However, it could also be that one or more conditions (e.g., a) and b)) should be true in all partitions, whereas one or more others (e.g., c)) have to be true in at least one partition only.

For the case of a certain condition having to be true or met only in at least one partition 130, the LFNST that is signaled for the whole block 120, if signaled to be activated, may be applied on all partitions 130 within the block 120, regardless of the individual availability conditions of each partition 130. Another possibility is that it could only be applied on those partitions 130 fulfilling this condition. If no partition 130 fulfills this availability condition, then the LFNST is not signaled (or parsed) and it is assumed the LFNST is not used.

The decoder/encoder may be configured to perform, e.g., block globally, the above described decision between reading the secondary transform flag 112f and inferring that the predetermined transform T is the first transform T1, once for all partitions 130 of the predetermined intra-predicted block 120 by checking for all partitions 130, one or more of the following criteria a to c, and deciding that the secondary transform flag 112f is to be read, if one or more first criteria of the following criteria a to c is/are met for all partitions 130 while one or more second criteria of the following criteria a to c is/are met for at least one partition:

a) no non-zero transform coefficient lies outside a predetermined area 140 and/or
b) a last non-zero coefficient position along a scan path leading from DC coefficient position to a highest frequency coefficient position, as indicated by a last position syntax element in the data stream, exceeds a further predetermined threshold, and/or c) the number of non-zero coefficients exceeds a predetermined limit According to an embodiment, the decoder/encoder is configured to decide that the secondary transform flag 112f is to be read, if one or more first criteria of the criteria a to c is/are met for all partitions 130 and/or if one or more second criteria of the criteria a to c is/are met for at least one partition 130. Thus it is possible, that the secondary transform flag 112f is read, if all partitions 130 meet one or more of the conditions a to c and without the necessity that additionally one or more second criteria have to be fulfilled by at least one of the partitions 130. Alternatively, it is also possible, that the secondary transform flag 112f is read for the whole block 120, if at least one partition 130 fulfills one or more of the second criteria, without the necessity that all partitions 130 have to meet at least one of the first criteria.

If the secondary transform flag 112f indicates that the predetermined transform T is the second transform T2, use the second transform T2 for partitions 130 for which the one or more second criteria is/are met and use the first transform T1 for partitions 130 for which at least one of the one or more second criteria is/are not met.

EXAMPLE 1

Let be a block 120 with N partitions 130 and the availability of the LFNST is defined by the conditions
a) All coefficients outside a predetermined area 140 have to be zero in all partitions 130
b) At least one partition 130 has to have a last significant position (in scan order) greater than a certain threshold.

In this example, the condition a) has to be true in all partitions 130 for LFNST to be available, but condition b) is only needed in at least one.

According to an embodiment, the one or more first criteria is no non-zero transform coefficient lies outside a predetermined area 140, and the one or more second criteria is a last non-zero coefficient position along a scan path leading from DC coefficient position to a highest frequency coefficient position, as indicated by a last position syntax element in the data stream 112, exceeds a further predetermined threshold.

EXAMPLE 2

Let be a block 120 with N partitions 130 and the availability of the LFNST is defined by the conditions
a) All coefficients outside a predetermined area 140 have to be zero in all partitions 130
b) The last significant position (in scan order) has to be greater than a certain threshold in all partitions.

In this example, both a) and b) have to be true in all partitions 130

EXAMPLE 3

Let be a block 120 with N partitions 130 and the availability of the LFNST is defined by the condition
a) All coefficients outside a predetermined area 140 have to be zero in all partitions 130

In this example, there is only an a) condition and it has to be true for all partitions 130 for LFNST to be available.

About the Utilization of New Kernels or Using the Existing Ones

It may be that the subpartitions 130 applying the secondary transform Ts share the same secondary transform as non-ISP blocks or that they have dedicated secondary transform tables that are only used for ISP subpartitions 130. This could be applied for all cases or maybe only for a subset of them. For example, for 1×N, 2×N, N×2 and N×1 subpartitions (or any subset depending on the dimensions of the subpartitions for that matter) or maybe depending on the intra mode or the subpartitions index or the ISP split type (horizontal or vertical), or other parameters that are available at the decoder side. That is, mutually disjoint Ts candidates may be used for a certain block in case of same being coded/decoded as an ISP (predetermined) block compared to being coded as a non-ISP block having otherwise associated therewith the same intra-coding mode.

For the utilization of the LFNST exist differences between a non-ISP block and an ISP block.

From an encoder perspective, the LFNST is an application of a 'secondary' transform to the coefficients of the 'primary' transform. This is subject to the lfnst index, i.e. the transform syntax element 112f, that may take 3 different values (0→no LFNST is applied, 1→the LFNST1 is applied, 2→the LFNST2 is applied). In other words, the transform syntax element 112f may indicate whether the second transform T2 is used for the block. If the transform syntax element 112f is in a first state (e.g., 0), it indicates the usage of the first transform T1 and if the transform syntax element 112f is in a second state (e.g., 1) or in a third state (e.g., 2), it indicates the usage of the second transform T2. LFNST1 and LFNST2 depend on the intra mode. That is, the basis functions used for the transform vary with respect to the intra mode.

Besides, a value of 0 for the lfnst index may be implicitly enforced if certain availability conditions are not met. In other words, the decoder/encoder may infer to use the first transform T1 for a non-ISP block, if the following availability conditions are not met:
Condition 1: There must not be non-zero coefficients outside a predetermined range (the range depends on the block size).
Condition 2: There has to be at least one non-zero coefficient that is not the DC coefficient (0,0).

The usage of LFNST in an ISP block is the same as in a non-ISP block with the following differences:
1) The LFNST is signalled globally only once for the whole block. In other words, the transform syntax element 112f is derived/signalled block globally.
2) The availability of the LFNST index, i.e. of the transform syntax element 112f, may depend on the following conditions. The conditions that have to happen so that the LFNST index can be parsed (otherwise, it is assumed to be 0) are the following:
   a. The sizes of the subpartitions have to be at least 4×4
   b. Condition 1 (described above) has to be fulfilled for all subpartitions. Therefore, if at least one violates it, then the LFNST0 (no LFNST) will be used for all subpartitions.
   c. Condition 2 (described above) is ignored for the ISP case. In other words, for the availability of the transform syntax element 112f it is not necessary that each partition comprises a non-zero coefficient that is not the DC coefficient (0,0).
3) If the LFNST index is parsed, then the following happens:
   a. The index is 0
      i. No LFNST is used for any subpartition
   b. The index is 1 i. For each subpartition, the LFNST1, e.g. a first variant of the second transform T2, is applied if the CBF (Coded Block Flag) of the subpartition is not zero c. The index is 2
i. For each subpartition, the LFNST2, e.g. a second variant of the second transform T2, is applied if the CBF of the subpartition is not zero If the LFNST index is 1 or 2, then the primary transform used for each subpartition will be the DCT2.

According to an embodiment, the transform syntax element 112f, i.e. the lfnst_idx, is parsed according to the coding unit syntax shown in FIG. 15.

According to an embodiment, the above discussed values of the lfnst_idx 112f may, for example, be binarized using a Truncated unary codeword of one or two bins, wherein a first bin may indicate whether the predetermined transform is the first transform T1 or the second transform T2 and the second bin may indicate which second transform T2 is to be used for the block 120 or the partitions 130. The first bin may represent a secondary transform flag and the second bin may represent a secondary-transform-indicating flag, i.e. the secondary-transform-indicating syntax element. The binarized lfnst_idx 112f, e.g. the first bin and/or the second bin, may be entropy encoded into the data stream using Context-adaptive binary arithmetic coding (CABAC). It is clear, that this is just an example and that the lfnst-idx 112f can be signaled in the data stream differently.

The function transform_tree 113, shown in FIG. 15, is recursive and loops over all subpartitions 130. The lfnst_idx 112f is therefore signaled only once at the end of the block 120. It may be checked 213 whether the width and height of the subpartitions 130 of the transform block 120 are both at least 4. The lfnst_idx 112f may only be signaled in the data stream or derived by the decoder from the data stream, if both the width and the height of each subpartition 130 of the transform block 120 is at least 4. This condition can only be violated in the LUMA component if the predetermined block is an ISP block, i.e. an intra-predicted block 120 partitioned into partitions 130 using the partitioning 128. In the ISP case, i.e. for a predetermined block 120 which is partitioned 128, the condition 2 is ignored (see LfnstDcOnly 313). In other words, for the predetermined block 120 which is partitioned 128, the information 136 identifying the predetermined transform T can be derived/signaled from/into the data stream without controlling whether at least one non-zero coefficient that is not the DC coefficient (0,0) is present in each partition 130. However, for each partition it is checked whether the CBF (Coded Block Flag) of the respective partition is not zero. The information 136 identifying the predetermined transform T may be derived/signaled from/into the data stream only for partitions comprising at least one non-zero transform coefficient. Note that in VVC a block using ISP has at least one partition with a non-zero CBF.

In the following, the transformation process for scaled transform coefficients is described. The primary transform selection for ISP may be affected by the lfnst_idx syntax element 112f. The primary transform is specified by trTypeHor and trTypeVer for the horizontal and vertical directions of the block 120 or each partition 130. The primary transform is a separable transform.

The variable trTypeHor specifying the horizontal transform kernel and the variable trTypeVer specifying the vertical transform kernel are derived as follows:
If one or more of the following conditions are true, trTypeHor and trTypeVer are set equal to 0.

cIdx is greater than 0
IntraSubPartitionsSplitType is not equal to ISP_NO_SPLIT and lfnst_idx is not equal to 0
Otherwise, if implicitMtsEnabled is equal to 1, the following applies:
If cu_sbt_flag is equal to 1, trTypeHor and trTypeVer are specified in Table 40 depending on cu_sbt_horizontal_flag and cu_sbt_pos_flag.
Otherwise (cu_sbt_flag is equal to 0), trTypeHor and trTypeVer are derived as follows:

$$trTypeHor = ( nTbW >= 4\ \&\&\ nTbW <= 16)\ ?\ 1 : 0$$
$$trTypeVer = ( nTbH >= 4\ \&\&\ nTbH <= 16)\ ?\ 1 : 0$$

Otherwise, trTypeHor and trTypeVer are specified in Table 39 of the VVC standard depending on mts_idx.

For the ISP case trTypeHor and trTypeVer are set to 0 (0 represents the DCT-II) if lfnst_idx is >0. Thus, the intra-predicted and partitioned predetermined block 120 uses as horizontal transform and as vertical transform the DCT-II as primary transform. The primary transform is the same as the first transform would be.

The flag that forces (DCT-II, DCT-II) as primary transform is called sps_mts_enabled_flag (MTS means "Multiple Transform Selection"). If the sps_mts_enabled_flag is 0, then the primary transform is the (DCT-II, DCT-II) in all cases and this is completely independent from the fact that the lfnst is used or not. In other words, the primary transform Tp equals the first transform T1. Thus the decoder/encoder is configured to derive/encode, from/into the data stream, the information 136 which identifies the predetermined transform T out of the set 138 of transforms including the first transform T1 and a second transform T2 which equals a concatenation of the first transform T1 and the secondary transform Ts applied onto the subset 140 of coefficients of the first transform T1. Therefore, we would have in this case DCT-II as primary transform for the lfnst_idx=0 and lfnst_idx>0 cases.

sps_mts_enabled_flag equal to 1 specifies that sps_explicit_mts_intra_enabled_flag and sps_explicit_mts_inter_enabled_flag are present in the SPS. sps_mts_enabled_flag equal to 0 specifies that sps_explicit_mts_intra_enabled_flag and sps_explicit_mts_inter_enabled_flag are not present in the SPS.

In the Transformation process for scaled transform coefficients the HLS flag set to 0 prevents setting the values of trTypeHor and trTypeVer:
The variable implicitMtsEnabled is derived as follows:
If sps_mts_enabled_flag is equal to 1 and one or more of the following conditions are true, implicitMtsEnabled is set equal to 1:
IntraSubPartitionsSplitType is not equal to ISP_NO_SPLIT
cu_sbt_flag is equal to 1 and Max (nTbW, nTbH) is less than or equal to 32
sps_explicit_mts_intra_enabled_flag is equal to 0 and CuPredMode[0][xTbY][yTbY] is equal to MODE_INTRA and lfnst_idx[x0][y0] is equal to 0 and intra_mip_flag[x0][y0] is equal to 0
Otherwise, implicitMtsEnabled is set equal to 0. The variable implicitMtsEnabled stays with the 0 value, which prevents that the primary transform can be anything other than DCT-II The variable trTypeHor specifying the horizontal transform kernel and the variable trTypeVer specifying the vertical transform kernel are derived as follows:

If one or more of the following conditions are true, trTypeHor and trTypeVer are set equal to 0.
  cIdx is greater than 0
  IntraSubPartitionsSplitType is not equal to ISP_NO_SPLIT and lfnst_idx is not equal to 0 (This forces the primary to be DCT-II if lfnst_idx is not 0. This is independent from implicitMtsEnabled. The primary transform is the first transform)
Otherwise, if implicitMtsEnabled is equal to 1, the following applies:
  If cu_sbt_flag is equal to 1, trTypeHor and trTypeVer are specified in Table 40 depending on cu_sbt_horizontal_flag and cu_sbt_pos_flag.
  Otherwise (cu_sbt_flag is equal to 0), trTypeHor and trTypeVer are derived as follows:

```
trTypeHor = ( nTbW >= 4 && nTbW <= 16) ? 1 : 0
trTypeVer = ( nTbH >= 4 && nTbH <= 16) ? 1 : 0
```

Otherwise, trTypeHor and trTypeVer are specified in Table 39 of the VVC standard depending on mts_idx. The transforms for the predetermined block 120, i.e. trTypeHor and trTypeVer, are set to their default values (mts_idx is 0 for ISP). Thus trTypeHor and trTypeVer are set 0, that is, the DCT-II.

Thus it is clear, that the first transform and the primary transform of the second transform can be the same transform. The decoder/encoder is configured to use the first transform as the primary transform.

Independent of the block 120 being partitioned 128 or not, i.e. being an ISP block or not, the second transform can be applied according to the following features:
  In particular, with the lfnst_idx 112f, the variable ApplyLfnstFlag is derived as follows:
    If tree Type is equal to SINGLE_TREE, the following applies:
      ApplyLfnstFlag=(lfnst_idx>0 && cIdx==0)? 1:0
    Otherwise, the following applies: ApplyLfnstFlag=(lfnst_idx>0)? 1:0

In the transformation process for scaled transform coefficients, the ApplyLfnstFlag prepares the variables for the transformation process and the ApplyLfnstFlag invokes it:
  When ApplyLfnstFlag is equal to 1, transform_skip_flag [xTbY][yTbY][cIdx] is equal to 0 and both nTbW and nTbH are greater than or equal to 4, the following applies:
    The variables predModeIntra, nLfnstOutSize, log 2LfnstSize, nLfnstSize, and nonZeroSize are derived as follows:

```
predModeIntra =
  ( cIdx = = 0 ) ? IntraPredModeY[ xTbY ][ yTbY ] :
  IntraPredModeC[ xTbY ][ yTbY ](1178)
nLfnstOutSize = ( nTbW >= 8 && nTbH >= 8 ) ? 48 : 16
log2LfnstSize = ( nTbW >= 8 && nTbH >= 8 ) ? 3 : 2
nLfnstSize = 1 << log2LfnstSize
nonZeroSize = ( ( nTbW = = 4 && nTbH = = 4 ) | |
  ( nTbW = = 8 && nTbH = = 8 ) ) ? 8 : 16
```

When intra_mip_flag[xTbY][yTbY] is equal to 1 and cIdx is equal to 0, predModeIntra is set equal to INTRA_PLANAR.
When predModeIntra is equal to either INTRA_LT_CCLM, INTRA_L_CCLM, or INTRA_T_CCLM, predModeIntra is derived as follows:

If intra_mip_flag[xTbY+nTbW*SubWidthC/2] [yTbY+nTbH*SubHeightC/2] is equal to 1, predModeIntra is set equal to INTRA_PLANAR.
Otherwise, if CuPredMode[0][xTbY+nTbW*SubWidthC/2][yTbY+ nTbH*SubHeight C/2] is equal to MODE_IBC or MODE_PLT, predModeIntra is set equal to INTRA_DC.
Otherwise, predModeIntra is set equal to IntraPredModeY[xTbY+nTbW*SubWidthC/2] [yTbY+nTbH*SubHeight C/2].

The wide angle intra prediction mode mapping process as specified in clause 8.4.5.2.6 is invoked with predModeIntra, nTbW, nTbH and cIdx as inputs, and the modified predModeIntra as output.
The values of the list u[x] with x=0 ... nonZeroSize−1 are derived as follows:

$$xC = DiagScanOrder[2][2][x][0]$$

$$yC = DiagScanOrder[2][2][x][1]$$

$$u[x] = d[xC][yC]$$

The one-dimensional low frequency non-separable transformation process as specified in clause 8.7.4.2 is invoked with the input length of the scaled transform coefficients nonZeroSize, the transform output length nTrS set equal to nLfnstOutSize, the list of scaled non-zero transform coefficients u[x] with x=0 ... nonZeroSize−1, and the intra prediction mode for LFNST set selection predModeIntra as inputs, and the list v[x] with x=0 ... nLfnstOutSize−1 as output. (This invokes the process that actually performs the lfnst transform process.)
The array d[x][y] with x=0 ... nLfnstSize−1, y=0 ... nLfnstSize−1 is derived as follows:
  If predModeIntra is less than or equal to 34, the following applies:

$$d[x][y] = (y < 4)? v[x + (y \ll \log2LfnstSize)]:$$
$$((x < 4)? v[32 + x + ((y - 4) \ll 2)]: d[x][y])$$

Otherwise, the following applies:

$$d[x][y] = (x < 4)? v[y + (x \ll \log2LfnstSize)]:$$
$$((y < 4)? v[32 + y + ((x - 4) \ll 2)]: d[x][y])$$

Figure 7:
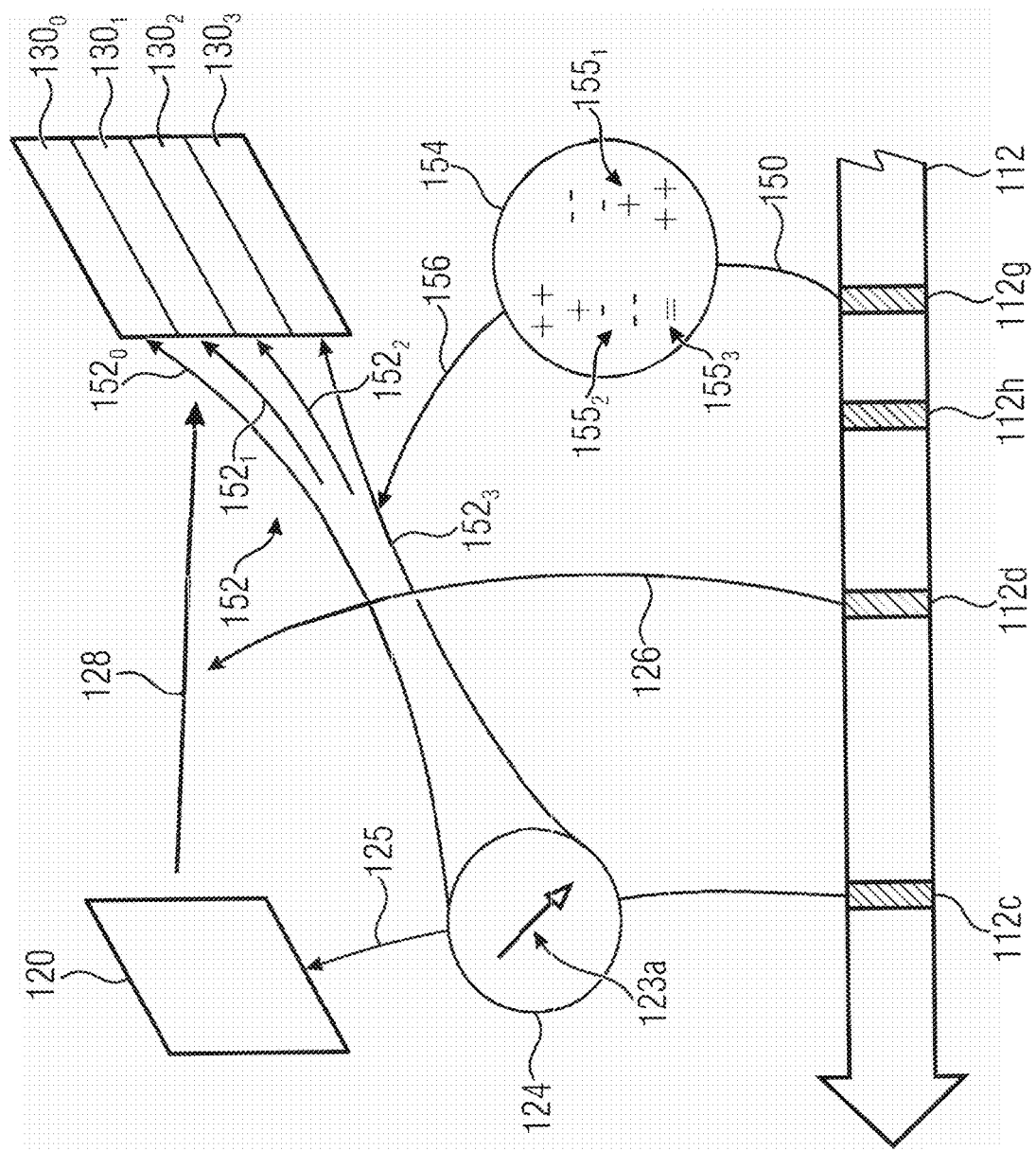
FIG. 7 shows a schematic view of a usage of partition-specific intra prediction modes, according to an embodiment.

According to an embodiment, the encoder/decoder described with regard to FIG. 4 and/or FIG. 5 can comprise features and/or functionalities as described with regard to FIGS. 6 to 8.

Usage of a Quad-Split (Embodiment)

The current design of ISP allows the usage of 2 different split types:
  Horizontal split: a block is divided along the vertical dimension in n parts
  Vertical split: a block is divided along the horizontal dimension in n parts In VTM-5.0, n can be 2 or 4 depending on the block size.

In the embodiment, shown in FIG. 6, a third split type is introduced. A picture 110 is coded into a data stream 112. A decoder/encoder, according to FIG. 6, is configured to derive/encode from/into the data stream 112 an assignment 112a of the picture 110, at a granularity of blocks 120 into which the picture 110 is subdivided, to a set 114 of prediction types which comprise intra prediction 116 and inter prediction 118, so that each block 120 is assigned to an associated prediction type out of the set 114 of prediction types. Additionally, the decoder/encoder is configured to derive/encode from/into the data stream 112, for each of intra-predicted blocks 120 to which the intra-prediction 116 is assigned, an associated intra-prediction mode 125 out of a set 122 of intra-prediction modes.

For each of predetermined intra-predicted blocks 120 the associated intra-prediction mode 125 of which is contained within a predetermined subset 124 of predetermined intra-prediction modes, the decoder/encoder is configured to derive/encode, from/into the data stream 112, an information 126 which identifies a partitioning 128 of the respective predetermined intra-predicted block 120 into partitions 130 out of a set 127 of partitioning modes including a first partitioning 127a according to which the respective predetermined intra-predicted block 120 is horizontally split so that the partitions 130 of the respective predetermined intra-predicted block 120 become as wide as the respective predetermined intra-predicted block 120, a second partitioning 127b according to which the respective predetermined intra-predicted block 120 is vertically split so that the partitions 130 of the respective predetermined intra-predicted block 120 become as high as the respective predetermined intra-predicted block 120 and a third partitioning 127c according to which the respective predetermined intra-predicted block 120 is split horizontally and vertically so that the partitions 130 of the respective predetermined intra-predicted block 120 are arranged in partition rows and partition columns. Additionally, for each of predetermined intra-predicted blocks 120 the associated intra-prediction mode 125 of which is contained within a predetermined subset 124 of predetermined intra-prediction modes, the decoder/encoder is configured to intra-predict each partition 130 of the respective predetermined intra-predicted block 120 in a manner depending on the predetermined intra-prediction mode 125 assigned to the respective predetermined intra-predicted block 120.

The decoder/encoder is configured to derive/encode, from/into the data stream 112, for each block 120, an information 112e on a prediction residual 132 for the respective block 120, by deriving/encoding the prediction residual 132 for each predetermined intra-predicted block 120 by deriving/encoding, from/into the data stream 112, for each partition 130 of the respective predetermined intra-predicted block 120, a partition-specific prediction residual signal 132 related to a spatial domain prediction residual signal of the respective partition 130 of the respective predetermined intra-predicted block 120 via a predetermined transform T.

Additionally, the decoder/encoder is configured to reconstruct each block 120 using the information on the prediction residual 132 for the respective block 120 and a prediction signal obtained using the prediction type 125 assigned to the respective block 120.

According to an embodiment, the respective predetermined intra-predicted block 120 is split as often horizontally as vertically at the third partitioning 127c so that a number of the partition rows equals the number of the partition columns.

According to an embodiment, the decoder is configured to derive, from the data stream 112, the information 126 which identifies the partitioning 128 of the respective predetermined intra-predicted block 120 into partitions 130 out of the set 127 of partitioning modes by reading a partitioning indicator 112d transmitted in the data stream 112 for the respective predetermined intra-predicted block 120, and by using the partitioning indicator 112d, i.e. a partitioning index, in order to identify the partitioning 128 of the respective predetermined intra-predicted block 120 out of the set 127 of partitioning modes. The encoder can comprise parallel features to the decoder, wherein the encoder is configured to encode the information 126 into the data stream 112 by transmitting the partition indicator 112d in the data stream 112.

According to an embodiment, the decoder is configured to read the partitioning indicator 112d transmitted in the data stream 112 for the respective predetermined intra-predicted block 120 by reading a first flag contained by the partitioning indicator 112d and indicating whether the partitioning 128 of the respective predetermined intra-predicted block 120 is the third partitioning 127c or not. The encoder can comprise parallel features to the decoder, wherein the encoder is configured to transmit the partitioning indicator 112d by transmitting the first flag. If the partitioning 128 of the respective predetermined intra-predicted block 120 is not the third partitioning 127c, the decoder/encoder is configured to read/transmit a second flag contained by the partitioning indicator 112d and indicating whether the partitioning 128 of the respective predetermined intra-predicted block 120 is the first 127a or the second partitioning 127b.

According to an embodiment, the encoder/decoder described with regard to FIG. 6 can comprise features and/or functionalities as described with regard to one of the embodiments in FIGS. 4, 5, 7 and 8.

Advantageous Version Example

Each partition would be equal sized and the value of n could be 2 or 4. Therefore, there would be either 4 or 16 partitions with the same dimensions.

Algorithm Proposal

It is proposed to include another split type, i.e. the third partitioning 127c, namely a quad-split, which would divide a block in both horizontal and vertical dimensions in n parts each. Therefore, the total number of subpartitions will be $n^2$. For example, for n=2, there will be 4 subpartitions altogether. This split type would need a new syntax element to indicate that it is used or it could be implicitly decided by existing block parameters at the decoder side, such the block dimensions or the intra mode. The split would work in the same way as the already existing split types.

Usage of Local Intra Modes (Embodiment)

In the ISP design of VTM-5.0, the intra mode is shared across all subpartitions. Therefore, it is, for example, only needed to signal it once for the whole block. Let us define this mode as global block mode.

In the embodiment, shown in FIG. 7, local intra modes are introduced. Each partition 130 (e.g., $130_0$-$130_3$) may be assigned to its own intra mode. Some partitions 130 of a predetermined intra-predicted block 120 may be assigned to the same intra mode as other partitions 130 of the predetermined intra-predicted block 120. Alternatively, each partition 130 of the predetermined intra-predicted block 120 is assigned to a different intra mode as other partitions 130 of the predetermined intra-predicted block 120.

FIG. 7 shows details of a decoder for decoding a picture from a data stream 112 and of an encoder for encoding the picture into the data stream 112. Also not shown in FIG. 7, the decoder/encoder is configured to derive/encode from/into a data stream 112 an assignment of a picture, at a granularity of blocks into which the picture is subdivided, to a set 114 of prediction types which comprise intra prediction 116 and inter prediction 118, so that each block 120 is assigned to an associated prediction type out of the set 114 of prediction types. This can be performed by the decoder/encoder similarly to a decoder/encoder described with regard to FIGS. 4 to 6.

Additionally, the decoder/encoder is configured to derive from the data stream 112, for each of intra-predicted blocks 120 to which the intra-prediction is assigned, an associated intra-prediction mode 125 out of a set of intra-prediction modes. The set of intra-prediction modes can be equal or similar to the set 122 described with regard to FIG. 4 or FIG. 6 and the in the following mentioned subset of predetermined intra-prediction modes can be equal or similar to the subset 124 of predetermined intra-prediction modes described with regard to FIG. 4 or FIG. 6.

For each of predetermined intra-predicted blocks 120 the associated intra-prediction mode 125 of which is contained within a predetermined subset 124 of predetermined intra-prediction modes, the decoder/encoder is configured to derive/encode, from/into the data stream 112, an information 126 on a partitioning 128 of the respective predetermined intra-predicted block 120 into partitions 130. The derivation or encoding of the partitioning 128 may be performed as described with regard to FIG. 4 and/or FIG. 6. Additionally, for each of predetermined intra-predicted blocks 120 the associated intra-prediction mode 125 of which is contained within a predetermined subset 124 of predetermined intra-prediction modes, the decoder/encoder is configured to derive/encode, from/into the data stream 112, an information 150 which identifies a predetermined rule 156 out of a set 154 of rules, using which, for each partition 130 of the respective predetermined intra-predicted block 120, a partition-specific intra prediction mode 152 is determined out of the predetermined subset 124 of predetermined intra-prediction modes based on the associated intra-prediction mode 125 for the respective predetermined intra-predicted block 120. Each partition 130 of the respective predetermined intra-predicted block 120 is intra-predicted using the partition-specific intra prediction mode 152 determined for the respective partition. A first partition-specific intra prediction mode $152_0$ may be assigned to a first partition $130_0$, a second partition-specific intra prediction mode $152_1$ may be assigned to a second partition $130_1$, a third partition-specific intra prediction mode $152_2$ may be assigned to a third partition $130_2$ and a fourth partition-specific intra prediction mode $152_3$ may be assigned to a fourth partition $130_3$. Which partition-specific intra prediction mode 152 is determined for a partition 130 depends on the predetermined rule 156 and the associated intra-prediction mode 125 for the respective predetermined intra-predicted block 120.

Additionally, the decoder/encoder is configured to derive/encode, from/into the data stream 112, for each block 120, an information on a prediction residual for the respective block 120, by deriving the prediction residual for each predetermined intra-predicted block 120 by deriving, from the data stream 112, for each partition 130 of the respective predetermined intra-predicted block 120, a partition-specific prediction residual signal 132 related to a spatial domain prediction residual signal 134 of the respective partition 130 of the respective predetermined intra-predicted block 120 via a predetermined transform T. The derivation of the prediction residual can be performed as described in FIG. 4 or FIG. 6.

The decoder/encoder is configured to reconstruct each block 120 using the information on the prediction residual for the respective block 120 and a prediction signal obtained using the prediction type assigned to the respective block 120. The block 120 may be reconstructed by obtaining, for each partition 130, a partition-specific prediction signal using the partition-specific intra prediction mode 152 determined for the respective partition 130. The partitions 130 may be intra-predicted sequentially. The block 120 may be reconstructed by sequentially reconstructing each partition 130 of the block 120 using the partition-specific prediction signal and the partition-specific prediction residual of the respective partition 130.

According to an embodiment, the decoder/encoder is configured to perform the intra-predicting of the partitions 130 of the respective predetermined intra-predicted block 120 in a manner depending on the predetermined intra-prediction mode 125 assigned to the respective predetermined intra-predicted block 120 sequentially with using a correction of an intra-prediction signal for previous partitions by the partition-specific prediction residual signal 132 of the previous partitions.

According to an embodiment, the decoder/encoder is configured to derive/encode, from/into the data stream 112, the information 150 which identifies the predetermined rule 156 out of the set 154 of rules, using which, for each partition 130 of the respective predetermined intra-predicted block 120, the partition-specific intra prediction mode 152 is determined out of the predetermined subset 124 of predetermined intra-prediction modes based on the associated intra-prediction mode 125 for the respective predetermined intra-predicted block, by reading a rule index 112g transmitted in the data stream 112 for the respective predetermined intra-predicted block 120, or by predicting the rule index based on characteristics of neighboring blocks. Thus the information 150 which identifies the predetermined rule 156 out of the set 154 of rules can be signaled explicitly with the rule index 112g transmitted in the data stream 112 or can be obtained implicitly by a prediction of the rule index based on characteristics of neighboring blocks neighboring the predetermined block 120. The rule index may be used in order to identify the predetermined rule 156 out of the set 154 of rules.

According to an embodiment, the decoder/encoder is configured so that each rule of the set 154 of rules determines the partition-specific intra prediction mode 152 for the partitions 130 of the respective predetermined intra-predicted block 120 such that, if the associated intra-prediction mode 125 for the respective predetermined intra-predicted block 120 is an angular mode 123a, the partition-specific intra prediction mode 152 for the partitions 130 of the respective predetermined intra-predicted block 120 are angular modes 123a too. Additionally, as indicated in FIG. 8, a mean of intra-prediction directions 170 of the partition-specific intra prediction modes 152 for the partitions 130 of the respective predetermined intra-predicted block 120 equals an intra-prediction direction 172 of the associated intra-prediction mode 125 for the respective predetermined intra-predicted block 120. FIG. 8 shows on the left the intra-prediction directions 170 of the partition-specific intra prediction modes 152 according to a first rule $155_1$ out of the set 154 of rules and FIG. 8 shows on the right the intra-prediction directions 170 of the partition-specific intra prediction modes 152 according to a second rule 155$_2$ out of the set 154 of rules, in case of the angular intra-prediction modes 123a being ordered according to a clockwise rotation of their associated intra-prediction direction.

As already outlined above, the angular intra-prediction modes 123a mutually differ in the intra-prediction direction 170/172. Each angular intra-prediction mode 123a may have an index associated with, wherein the association of indexes to the angular intra-prediction modes 123a may be such that the directions, when ordering the angular intra-prediction modes 123a according to the associated mode indexes, monotonically rotate clockwise or anticlockwise.

According to an embodiment, the decoder/encoder is configured so that the set 154 of rules comprises one or more pairs of a first variant rule, e.g. 155$_1$, and a second variant rule, e.g. 155$_2$. The first variant rule, e.g. the first rule 155$_1$, which determines the partition-specific intra prediction mode 152 for the partitions 130 of the respective predetermined intra-predicted block 120 in a manner so that, when spatially traversing the partitions 130 along a predetermined direction 174, the intra-prediction direction 170 of the partition-specific intra prediction mode 152 for the partitions 130 of the respective predetermined intra-predicted block 120 deviates from the intra-prediction direction 172 of the associated intra-prediction mode 125 for the respective predetermined intra-predicted block 120 in angular deviation magnitude monotonically increasing with a distance to a mid of the respective predetermined intra-predicted block 120 along the predetermined direction 174 and at opposite angular deviation sign upstream the mid compared to downstream the mid. The second variant rule, e.g. the second rule 155$_2$, which determines the partition-specific intra prediction mode 152 for the partitions 130 of the respective predetermined intra-predicted block 120 in a manner so that, for each partition 130 of the respective predetermined intra-predicted block 120, the intra-prediction direction 170 of the partition-specific intra prediction mode 152 for the respective partition 130, deviates from the intra-prediction direction 172 of the associated intra-prediction mode 125 for the respective predetermined intra-predicted block 120 at an angular deviation magnitude equal to, and at an angular deviation sign opposite to, the deviation of the intra-prediction direction 170 of the partition-specific intra prediction mode 152 for the respective partition 130 from the associated intra-prediction mode 125 for the respective predetermined intra-predicted block 120 according to the first variant rule, e.g. the first rule 155$_1$. The first variant rule 155$_1$ and the second variant rule$_2$ define the partition-specific intra prediction mode 152 per partition by the same angular deviation magnitude but an opposite angular deviation sign.

At the above described derivation or encoding of the partitioning 128, the information 126 may identify the partitioning 128 out of a set 127 of partitioning modes. The set 127 of partitioning modes may include, as shown in FIG. 4 or FIG. 6, a first partitioning 127a according to which the respective predetermined intra-predicted block 120 is horizontally split so that the partitions 130 of the respective predetermined intra-predicted block 120 become as wide as the respective predetermined intra-predicted block 120, and a second partitioning 127b according to which the respective predetermined intra-predicted block 120 is vertically split so that the partitions 130 of the respective predetermined intra-predicted block 120 become as high as the respective predetermined intra-predicted block 120. Optionally, the set 127 of partitioning modes comprises a third partitioning 127c according to which the respective predetermined intra-predicted block 120 is split horizontally and vertically so that the partitions 130 of the respective predetermined intra-predicted block 120 are arranged in partition rows and partition columns. The predetermined direction 174 is vertical in case of the partitioning 128 of the respective predetermined intra-predicted block 120 being the first partitioning 127a and horizontal in case of the partitioning 128 of the respective predetermined intra-predicted block being the second partitioning 127b. The partitioning, shown in FIG. 7 and FIG. 8, is performed according to the first partitioning 127a.

According to an embodiment, the decoder/encoder is configured to determine the partitioning 128 in terms of a number of the partitions 130 based on dimensions of the respective predetermined intra-predicted block 120. The partitioning 128 depends, for example, on a heights and a width of the respective predetermined intra-predicted block 120. The partitioning 128 may lead to a number of the partitions 130 which exceeds two. The respective predetermined intra-predicted block 120 may be partitioned by the partitioning 128 into at least three partitions 130.

According to an embodiment, the encoder/decoder described with regard to FIGS. 7 and/or 8 can comprise features and/or functionalities as described with regard to FIGS. 1 to 6.

Algorithm Proposal

It is proposed to allow each subpartition 130 to have its own intra mode, i.e. the partition-specific intra prediction mode 152, that does not necessarily have to be equal to the global block mode, i.e. the associated intra-prediction mode 125. In this new approach, the global block mode 125 would, for example, still be parsed by the decoder, but then each subpartition 130 would have its own local mode 152. This local mode 152 could be dependent on the global block mode 125, the subpartition index, an explicitly sent syntax element, the neighboring intra modes, etc. For example, let us have a block 120 with 4 subpartitions, e.g. the partitions 130$_0$ to 130$_3$, with indices from 0 to 3 and a global intra mode i. Then, the local intra mode 152 of the subpartitions 130 could the following:

```
local mode 0 = i − 2
local mode 1 = i − 1
local mode 2 = i + 1
local mode 3 = i + 2
```

Advantageous Version Examples

If ISP is used, a flag, i.e. a local intra-prediction indication 112h, is parsed by the decoder to decide whether there will be local variations of the intra mode 125 or not. The decoder/encoder may be configured to read/transmit the local intra-prediction indication 112h indicating whether partition-specific intra prediction modes 152 are used for a prediction of each partition 130.

If there will be local variations, then a second flag, i.e. the rule index 112g, will be sent to indicate which model of variations, i.e. rule 156, will be employed. In case of the local intra-prediction indication 112h indicating the usage of partition-specific intra prediction modes 152, the decoder/encoder may be configured to read/transmit the rule index 112g or to predict the rule index based on characteristics of neighboring blocks and use the rule index in order to identify the predetermined rule 156 out of the set 154 of rules. There are, for example, 2 possibilities:

| Subpartition Index | Model 1 | Model 2 |
|---|---|---|
| 0 | i − 3 | i + 3 |
| 1 | i − 1 | i + 1 |
| 2 | i + 1 | i − 1 |
| 3 | i + 3 | i − 3 |

Additional Notes

The picture 110, shown in FIG. 4 or FIG. 6, can be associated with the picture 12 or 12' described with regard to FIGS. 1 to 3. The data stream 112, shown in FIG. 4, FIG. 6 and FIG. 7, can be associated with the data stream 14 described with regard to FIG. 1 and FIG. 2. The intra-predicted blocks 120, shown in FIG. 4, FIG. 6, FIG. 7 and FIG. 8, can be associated with the intra-predicted blocks 80 described with regard to FIG. 3.

Figure 9:
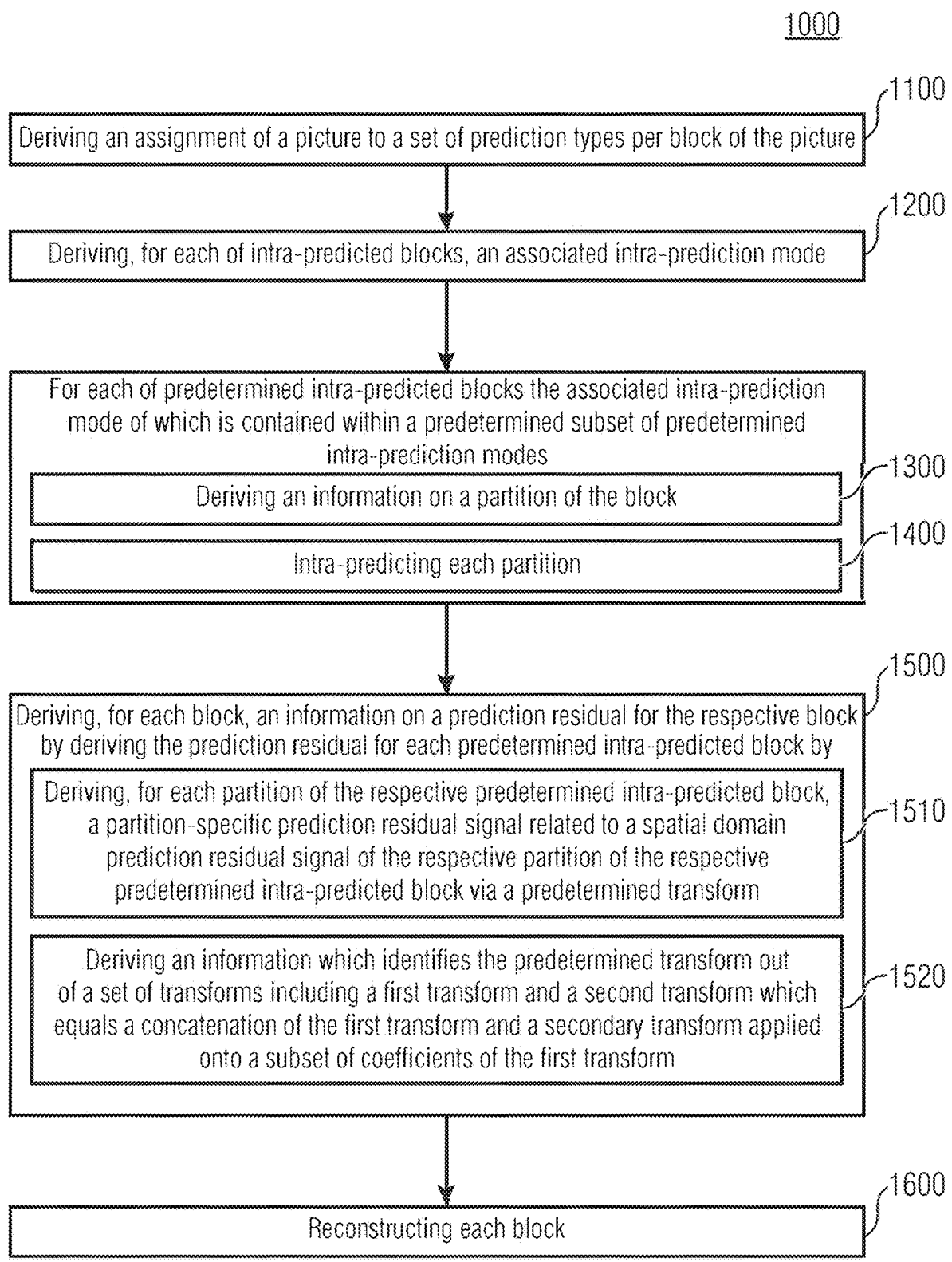
FIG. 9 shows a block diagram of a method for decoding a picture using of a secondary transform per partition of a block of the picture to be decoded, according to an embodiment.

FIG. 9 shows a method 1000 for decoding a picture, comprising deriving 1100, from a data stream, into which the picture is coded, an assignment of a picture, at a granularity of blocks into which the picture is subdivided, to a set of prediction types which comprise intra prediction and inter prediction, so that each block is assigned to an associated prediction type out of the set of prediction types. The method 1000 comprises deriving 1200, from the data stream, for each of intra-predicted blocks to which the intra-prediction is assigned, an associated intra-prediction mode out of a set of intra-prediction modes. For each of predetermined intra-predicted blocks the associated intra-prediction mode of which is contained within a predetermined subset of predetermined intra-prediction modes, the method 1000 comprises deriving 1300, from the data stream, an information on a partitioning of the respective predetermined intra-predicted block into partitions, and intra-predicting 1400 each partition of the respective predetermined intra-predicted block in a manner depending on the predetermined intra-prediction mode assigned to the respective predetermined intra-predicted block. Additionally, the method 1000 comprises deriving 1500, from the data stream, for each block, an information on a prediction residual for the respective block, by deriving the prediction residual for each predetermined intra-predicted block by deriving 1510, from the data stream, for each partition of the respective predetermined intra-predicted block, a partition-specific prediction residual signal related to a spatial domain prediction residual signal of the respective partition of the respective predetermined intra-predicted block via a predetermined transform. Additionally, the method 1000 comprises deriving 1500, from the data stream, for each block, an information on a prediction residual for the respective block, by deriving the prediction residual for each predetermined intra-predicted block by deriving 1520, from the data stream, an information which identifies the predetermined transform out of a set of transforms including a first transform and a second transform which equals a concatenation of a primary transform and a secondary transform applied onto a subset of coefficients of the primary transform. Each block is reconstructed 1600 using the information on the prediction residual for the respective block and a prediction signal obtained using the prediction type assigned to the respective block.

Figure 10:
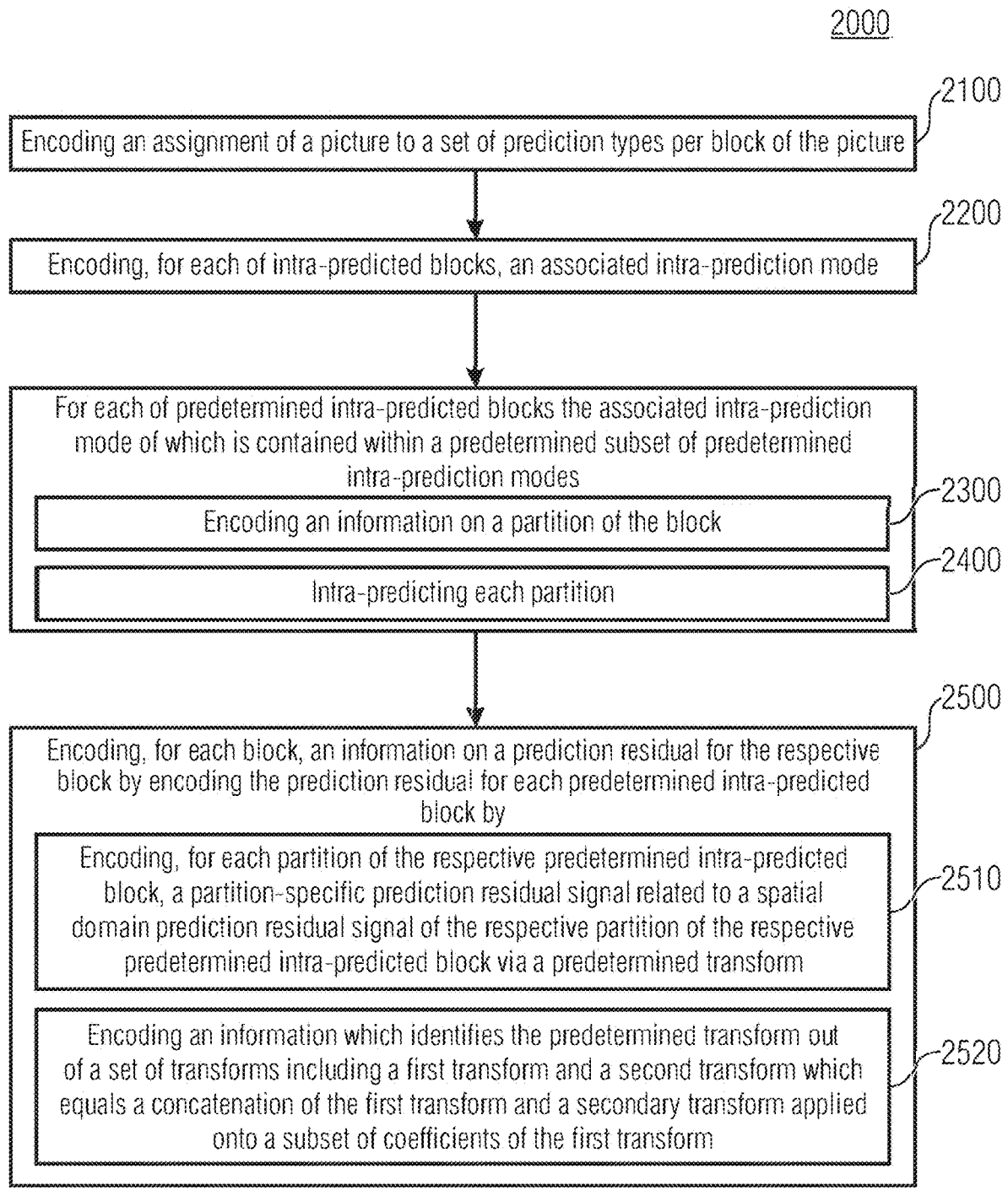
FIG. 10 shows a block diagram of a method for encoding a picture using of a secondary transform per partition of a block of the picture to be encoded, according to an embodiment.

As shown in FIG. 10, a method 2000 for encoding a picture, parallel to the method 1000 for decoding, comprises encoding 2100, into a data stream, into which the picture is coded, an assignment of a picture, at a granularity of blocks into which the picture is subdivided, to a set of prediction types which comprise intra prediction and inter prediction, so that each block is assigned to an associated prediction type out of the set of prediction types. The method 2000 comprises encoding 2200, into the data stream, for each of intra-predicted blocks to which the intra-prediction is assigned, an associated intra-prediction mode out of a set of intra-prediction modes. For each of predetermined intra-predicted blocks the associated intra-prediction mode of which is contained within a predetermined subset of predetermined intra-prediction modes, the method 2000 comprises encoding 2300, into the data stream, an information on a partitioning of the respective predetermined intra-predicted block into partitions, and intra-predicting 2400 each partition of the respective predetermined intra-predicted block in a manner depending on the predetermined intra-prediction mode assigned to the respective predetermined intra-predicted block. Additionally, the method 2000 comprises encoding 2500, into the data stream, for each block, an information on a prediction residual for the respective block, by encoding the prediction residual for each predetermined intra-predicted block by encoding 2510, into the data stream, for each partition of the respective predetermined intra-predicted block, a partition-specific prediction residual signal related to a spatial domain prediction residual signal of the respective partition of the respective predetermined intra-predicted block via a predetermined transform. Additionally, the method 2000 comprises encoding 2500, into the data stream, for each block, an information on a prediction residual for the respective block, by encoding the prediction residual for each predetermined intra-predicted block by encoding 2520, into the data stream, an information which identifies the predetermined transform out of a set of transforms including a first transform and a second transform which equals a concatenation of a primary transform and a secondary transform applied onto a subset of coefficients of the primary transform. For each block, the respective block is reconstructable using the information on the prediction residual for the respective block and a prediction signal obtained using the prediction type assigned to the respective block.

Figure 11:
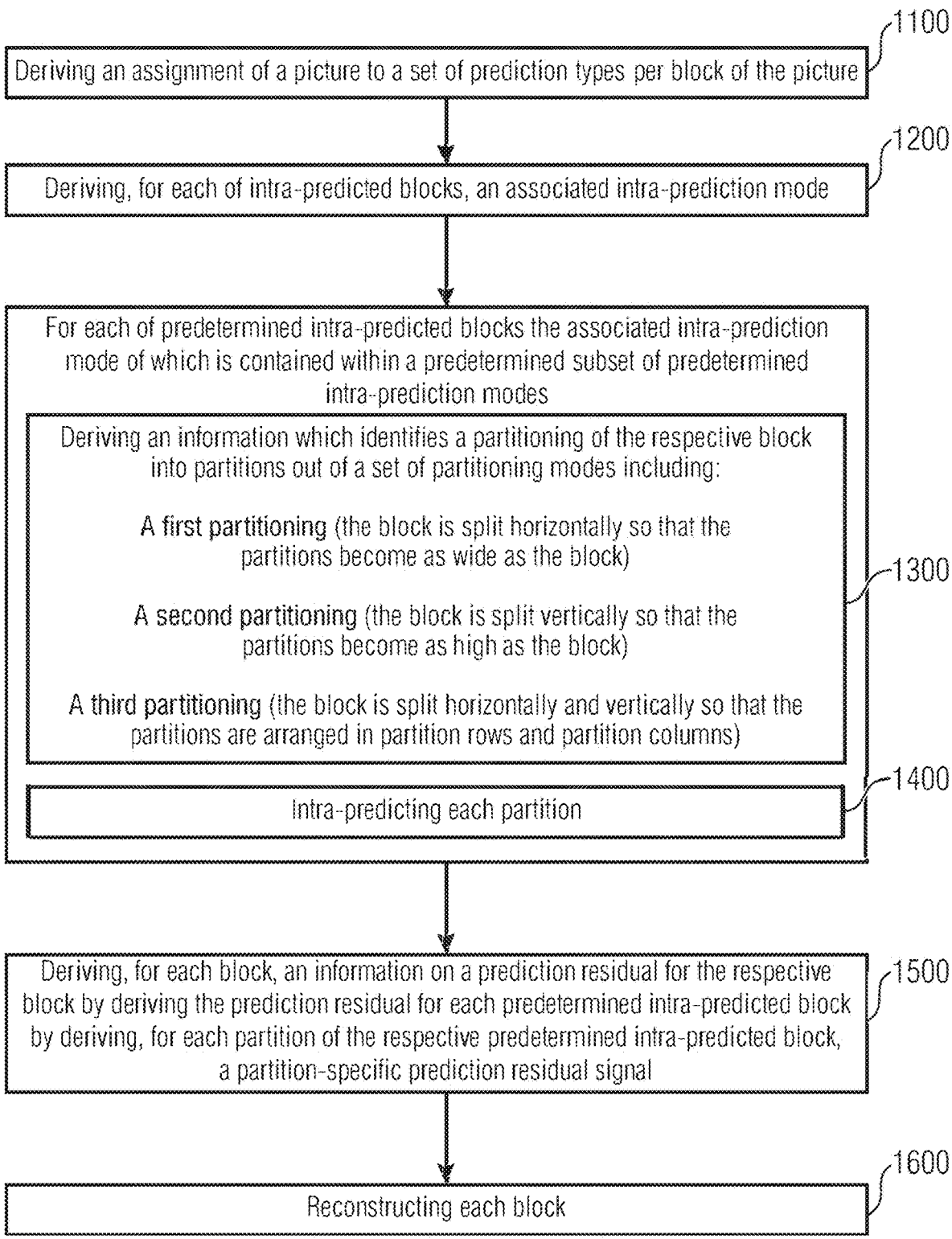
FIG. 11 shows a block diagram of a method for decoding a picture using a third partitioning for a block of the picture, according to an embodiment.

FIG. 11 shows a method 3000 for decoding a picture, comprising deriving 1100 from a data stream, into which the picture is coded, an assignment of a picture, at a granularity of blocks into which the picture is subdivided, to a set of prediction types which comprise intra prediction and inter prediction, so that each block is assigned to an associated prediction type out of the set of prediction types. The method 3000 comprises deriving 1200, from the data stream, for each of intra-predicted blocks to which the intra-prediction is assigned, an associated intra-prediction mode out of a set of intra-prediction modes. For each of predetermined intra-predicted blocks the associated intra-prediction mode of which is contained within a predetermined subset of predetermined intra-prediction modes, the method 3000 comprises deriving 1300, from the data stream, an information which identifies a partitioning of the respective predetermined intra-predicted block into partitions out of a set of partitioning modes including a first partitioning according to which the respective predetermined intra-predicted block is horizontally split so that the partitions of the respective predetermined intra-predicted block become as wide as the respective predetermined intra-predicted block, a second partitioning according to which the respective predetermined intra-predicted block is vertically split so that the partitions of the respective predetermined intra-predicted block become as high as the respective predetermined intra-predicted block and a third partitioning according to which the respective predetermined intra-predicted block is split horizontally and vertically so that the partitions of the respective predetermined intra-predicted block are arranged in partition rows and partition columns. For each of predetermined intra-predicted blocks the associated intra-prediction mode of which is contained within a predetermined subset of predetermined intra-prediction modes, the method 3000 comprises intra-predicting 1400 each partition of the respective predetermined intra-predicted block in a manner depending on the predetermined intra-prediction mode assigned to the respective predetermined intra-predicted block. Additionally, the method 3000 comprises deriving 1500, from the data stream, for each block, an information on a prediction residual for the respective block, by deriving the prediction residual for each predetermined intra-predicted block by deriving, from the data stream, for each partition of the respective predetermined intra-predicted block, a partition-specific prediction residual signal related to a spatial domain prediction residual signal of the respective partition of the respective predetermined intra-predicted block via a predetermined transform. The method 3000 comprises reconstructing 1600 each block using the information on the prediction residual for the respective block and a prediction signal obtained using the prediction type assigned to the respective block.

Figure 12:
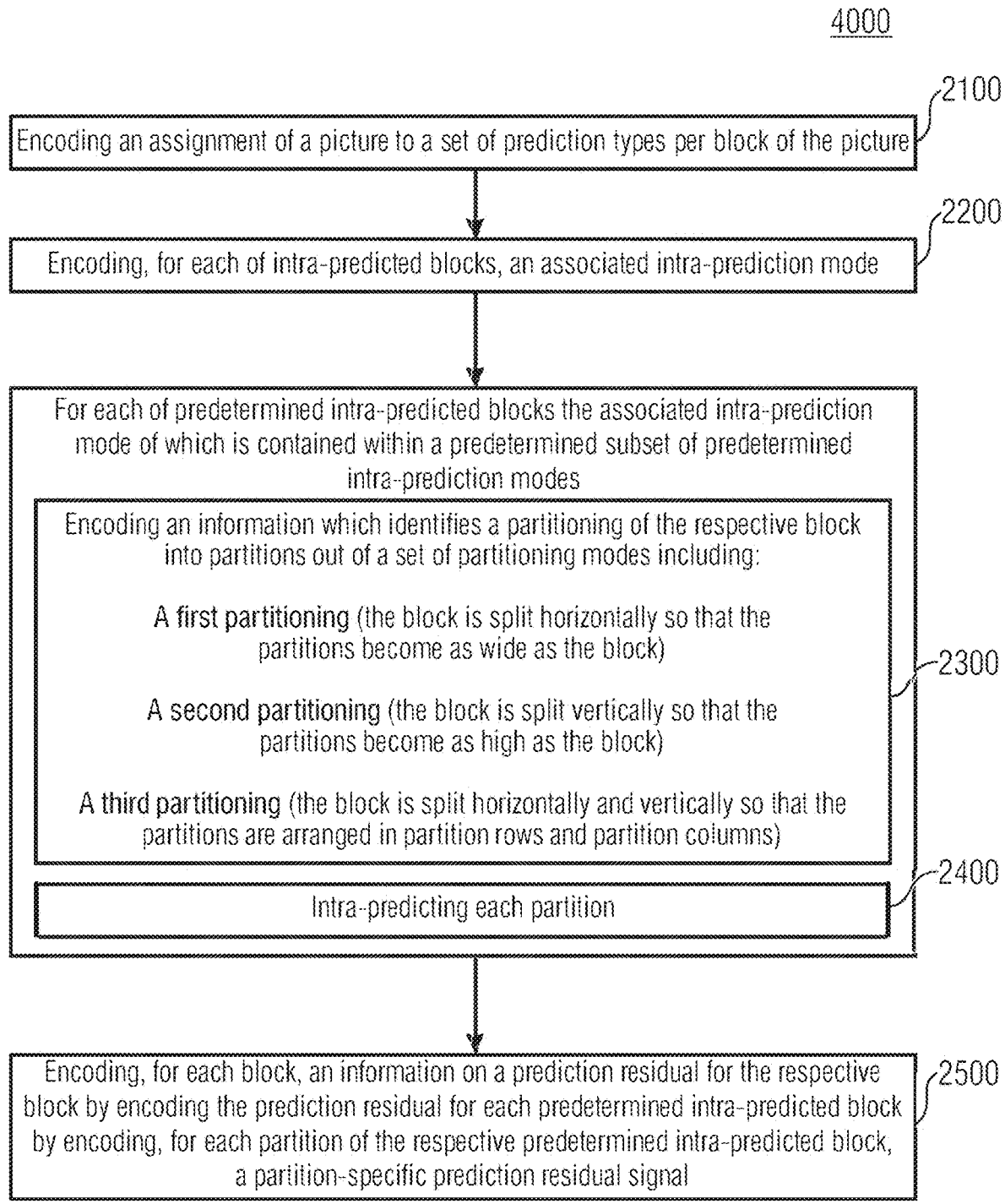
FIG. 12 shows a block diagram of a method for encoding a picture using a third partitioning for a block of the picture, according to an embodiment.

As shown in FIG. 12, a method 4000 for encoding a picture, parallel to the method 3000 for decoding, comprises encoding 2100, into a data stream, into which the picture is coded, an assignment of a picture, at a granularity of blocks into which the picture is subdivided, to a set of prediction types which comprise intra prediction and inter prediction, so that each block is assigned to an associated prediction type out of the set of prediction types. The method 4000 comprises encoding 2200, into the data stream, for each of intra-predicted blocks to which the intra-prediction is assigned, an associated intra-prediction mode out of a set of intra-prediction modes. For each of predetermined intra-predicted blocks the associated intra-prediction mode of which is contained within a predetermined subset of predetermined intra-prediction modes, the method 4000 comprises encoding 2300, into the data stream, an information which identifies a partitioning of the respective predetermined intra-predicted block into partitions out of a set of partitioning modes including a first partitioning according to which the respective predetermined intra-predicted block is horizontally split so that the partitions of the respective predetermined intra-predicted block become as wide as the respective predetermined intra-predicted block, a second partitioning according to which the respective predetermined intra-predicted block is vertically split so that the partitions of the respective predetermined intra-predicted block become as high as the respective predetermined intra-predicted block and a third partitioning according to which the respective predetermined intra-predicted block is split horizontally and vertically so that the partitions of the respective predetermined intra-predicted block are arranged in partition rows and partition columns. For each of predetermined intra-predicted blocks the associated intra-prediction mode of which is contained within a predetermined subset of predetermined intra-prediction modes, the method 4000 comprises intra-predicting 2400 each partition of the respective predetermined intra-predicted block in a manner depending on the predetermined intra-prediction mode assigned to the respective predetermined intra-predicted block. Additionally, the method 4000 comprises encoding 2500, into the data stream, for each block, an information on a prediction residual for the respective block, by encoding the prediction residual for each predetermined intra-predicted block by encoding, into the data stream, for each partition of the respective predetermined intra-predicted block, a partition-specific prediction residual signal related to a spatial domain prediction residual signal of the respective partition of the respective predetermined intra-predicted block via a predetermined transform. For each block the respective block is reconstructable using the information on the prediction residual for the respective block and a prediction signal obtained using the prediction type assigned to the respective block.

Figure 13:
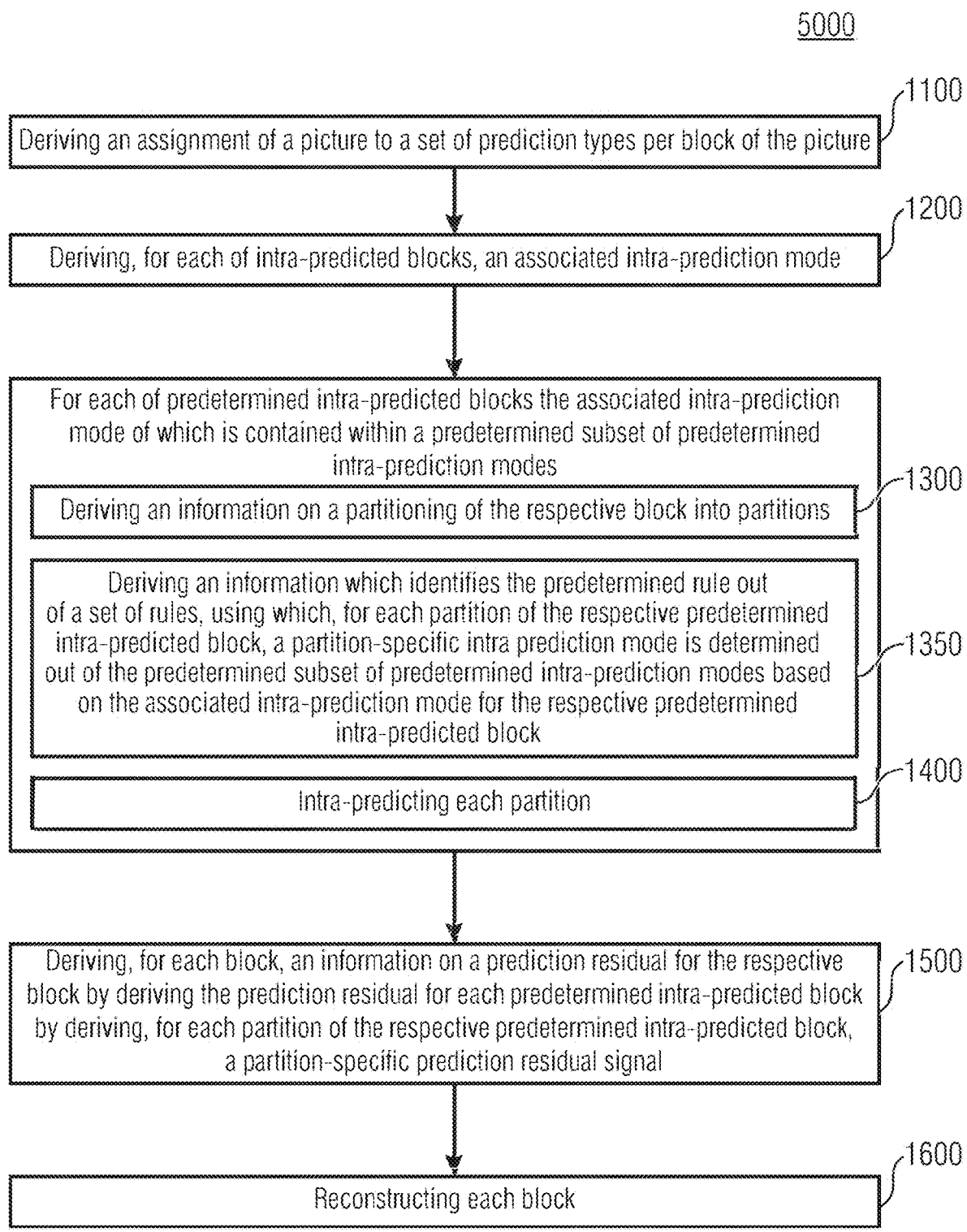
FIG. 13 shows a block diagram of a method for decoding a picture using partition-specific intra prediction modes for a block of the picture, according to an embodiment.

FIG. 13 shows a method 5000 for decoding a picture, comprising deriving 1100 from a data stream, into which the picture is coded, an assignment of a picture, at a granularity of blocks into which the picture is subdivided, to a set of prediction types which comprise intra prediction and inter prediction, so that each block is assigned to an associated prediction type out of the set of prediction types. The method 5000 comprises deriving 1200, from the data stream, for each of intra-predicted blocks to which the intra-prediction is assigned, an associated intra-prediction mode out of a set of intra-prediction modes. For each of predetermined intra-predicted blocks the associated intra-prediction mode of which is contained within a predetermined subset of predetermined intra-prediction modes, the method 5000 comprises deriving 1300, from the data stream, an information on a partitioning of the respective predetermined intra-predicted block into partitions, deriving 1350, from the data stream, an information which identifies a predetermined rule out of a set of rules, using which, for each partition of the respective predetermined intra-predicted block, a partition-specific intra prediction mode is determined out of the predetermined subset of predetermined intra-prediction modes based on the associated intra-prediction mode for the respective predetermined intra-predicted block, and intra-predicting 1400 each partition of the respective predetermined intra-predicted block using the partition-specific intra prediction mode determined for the respective partition. Additionally the method 5000 comprises deriving 1500, from the data stream, for each block, an information on a prediction residual for the respective block, by deriving the prediction residual for each predetermined intra-predicted block by deriving, from the data stream, for each partition of the respective predetermined intra-predicted block, a partition-specific prediction residual signal related to a spatial domain prediction residual signal of the respective partition of the respective predetermined intra-predicted block via a predetermined transform. The method 5000 comprises reconstructing 1600 each block using the information on the prediction residual for the respective block and a prediction signal obtained using the prediction type assigned to the respective block.

Figure 14:
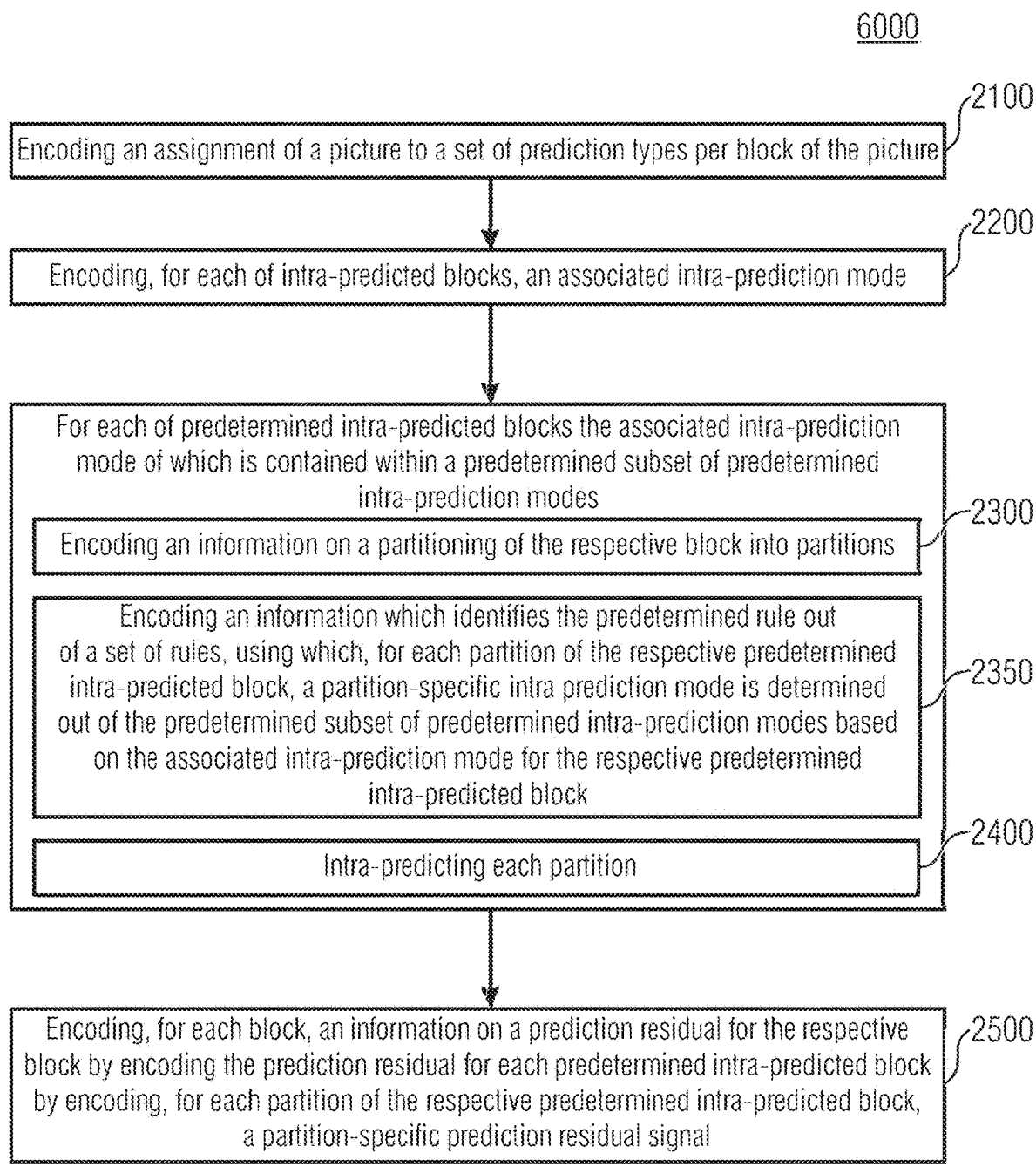
FIG. 14 shows a block diagram of a method for encoding a picture using partition-specific intra prediction modes for a block of the picture, according to an embodiment.

As shown in FIG. 14, a method 6000 for encoding a picture, parallel to the method 5000 for decoding, comprises encoding 2100, into a data stream, into which the picture is coded, an assignment of a picture, at a granularity of blocks into which the picture is subdivided, to a set of prediction types which comprise intra prediction and inter prediction, so that each block is assigned to an associated prediction type out of the set of prediction types. The method 6000 comprises encoding 2200, into the data stream, for each of intra-predicted blocks to which the intra-prediction is assigned, an associated intra-prediction mode out of a set of intra-prediction modes. For each of predetermined intra-predicted blocks the associated intra-prediction mode of which is contained within a predetermined subset of predetermined intra-prediction modes, the method 6000 comprises encoding 2300, into the data stream, an information on a partitioning of the respective predetermined intra-predicted block into partitions, encoding 2350, into the data stream, an information which identifies a predetermined rule out of a set of rules, using which, for each partition of the respective predetermined intra-predicted block, a partition-specific intra prediction mode is determined out of the predetermined subset of predetermined intra-prediction modes based on the associated intra-prediction mode for the respective predetermined intra-predicted block, and intra-predicting 2400 each partition of the respective predetermined intra-predicted block using the partition-specific intra prediction mode determined for the respective partition. Additionally, the method 6000 comprises encoding 2500, into the data stream, for each block, an information on a prediction residual for the respective block, by encoding the prediction residual for each predetermined intra-predicted block by encoding, into the data stream, for each partition of the respective predetermined intra-predicted block, a partition-specific prediction residual signal related to a spatial domain prediction residual signal of the respective partition of the respective predetermined intra-predicted block via a predetermined transform. For each block the respective block is reconstructable using the information on the prediction residual for the respective block and a prediction signal obtained using the prediction type assigned to the respective block.

FURTHER EMBODIMENTS

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A video decoder, the video decoder configured to:
decode, from a data stream, an intra-prediction mode for an intra-predicted block of a picture;
decode, from the data stream, information on a partitioning of the intra-predicted block into partitions;
determine a partition-specific intra-prediction for each partition of the intra-predicted block using the intra-prediction mode;
decode, from the data stream, for each partition of the intra-predicted block, a partition-specific transform domain residual;
determine whether, for each partition of the intra-predicted block, no non-zero transform coefficient lies outside a respective area;
responsive to a determination that, for each partition of the intra-predicted block, no non-zero transform coefficient lies outside the respective area, decode a secondary transform index for the intra-predicted block from the data stream, wherein the secondary transform index indicates one of: 1) not using an inverse secondary transform, 2) using a first inverse secondary transform or 3) using a second inverse secondary transform;
determine a partition-specific spatial domain residual from the partition-specific transform domain residual for each partition of the intra-predicted block; and
reconstruct each partition of the intra-predicted block using the partition-specific spatial domain residual and the partition-specific intra-prediction.

2. The video decoder of claim 1, wherein the partition-specific spatial domain residual is computed based on the secondary transform index.

3. The video decoder of claim 1, configured to:
responsive to a determination that for at least one partition of the intra-predicted block there is a non-zero transform coefficient outside the respective area, not decode the secondary transform index from the data stream and infer that no secondary transform is used for the intra-predicted block.

4. The video decoder of claim 1, wherein:
the first inverse secondary transform or the second inverse secondary transform is further indicated by the intra-prediction mode.

5. A method of video decoding, the method comprising:
decoding, from a data stream, an intra-prediction mode for an intra-predicted block of a picture;
decoding, from the data stream, information on a partitioning of the intra-predicted block into partitions;
determining a partition-specific intra-prediction for each partition of the intra-predicted block using the intra-prediction mode;
decoding, from the data stream, for each partition of the intra-predicted block, a partition-specific transform domain residual;
determining whether, for each partition of the intra-predicted block, no non-zero transform coefficient lies outside a respective area;
responsive to a determination that, for each partition of the intra-predicted block, no non-zero transform coefficient lies outside the respective area, decoding a secondary transform index for the intra-predicted block from the data stream, wherein the secondary transform index indicates one of: 1) not using an inverse secondary transform, 2) using a first inverse secondary transform or 3) using a second inverse secondary transform;
determining a partition-specific spatial domain residual from the partition-specific transform domain residual for each partition of the intra-predicted block; and
reconstructing each partition of the intra-predicted block using the partition-specific spatial domain residual and the partition-specific intra-prediction.

6. The method of claim 5, wherein the partition-specific spatial domain residual is determined based on the secondary transform index.

7. The method of claim 5, comprising:
responsive to a determination that for at least one partition of the intra-predicted block there is a non-zero transform coefficient outside the respective area, not decoding the secondary transform index from the data stream and inferring that no secondary transform is used for the intra-predicted block.

8. The method of claim 5, wherein:
the first inverse secondary transform or the second inverse secondary transform is further indicated by the intra-prediction mode.

9. A video encoder, the video encoder configured to:
encode, into a data stream, an intra-prediction mode for an intra-predicted block of a picture;
encode, into the data stream, information on a partitioning of the intra-predicted block into partitions;
determine a partition-specific intra-prediction for each partition of the intra-predicted block using the intra-prediction mode;
encode, into the data stream, a partition-specific transform domain residual for each partition of the intra-predicted block;
determine whether, for each partition of the intra-predicted block, no non-zero transform coefficient lies outside a respective area; and
responsive to a determination that, for each partition of the intra-predicted block, no non-zero transform coefficient lies outside the respective area, encode a secondary transform index for the intra-predicted block into the data stream, wherein the secondary transform index indicates one of: 1) not using an inverse secondary transform, 2) using a first inverse secondary transform or 3) using a second inverse secondary transform.

10. The video encoder of claim 9, configured to:
responsive to a determination that for at least one partition of the intra-predicted block there is a non-zero transform coefficient outside the respective area, not encode the secondary transform index and infer that no secondary transform is used for the intra-predicted block.

11. The video encoder of claim 9, wherein:
the first inverse secondary transform or the second inverse secondary transform is further indicated by the intra-prediction mode.

12. A method of video encoding, the method comprising:
encoding, into a data stream, an intra-prediction mode for an intra-predicted block of a picture;
encoding, into the data stream, information on a partitioning of the intra-predicted block into partitions;
determining a partition-specific intra-prediction for each partition of the intra-predicted block using the intra-prediction mode;
encoding, into the data stream, a partition-specific transform domain residual for each partition of the intra-predicted block;
determining whether, for each partition of the intra-predicted block, no non-zero transform coefficient lies outside a respective area; and responsive to a determination that, for each partition of the intra-predicted block, no non-zero transform coefficient lies outside the respective area, encoding a secondary transform index for the intra-predicted block into the data stream, wherein the secondary transform index indicates one of: 1) not using an inverse secondary transform, 2) using a first inverse secondary transform or 3) using a second inverse secondary transform.

13. The method of claim 12, comprising:

responsive to a determination that for at least one partition of the intra-predicted block there is a non-zero transform coefficient outside the respective area, not encoding the secondary transform index and inferring that no secondary transform is used for the intra-predicted block.

14. The method of claim 12, wherein:

the first inverse secondary transform or the second inverse secondary transform is further indicated by the intra-prediction mode.

* * * * *